US008781390B2

(12) United States Patent
Bakir

(10) Patent No.: US 8,781,390 B2
(45) Date of Patent: Jul. 15, 2014

(54) KNOWLEDGE ASSESSMENT TOOL

(75) Inventor: Huzefa Yusuf Bakir, Maharastra (IN)

(73) Assignee: Accenture Global Services Limited (IE)

( * ) Notice: Subject to any disclaimer, the term of this patent is extended or adjusted under 35 U.S.C. 154(b) by 896 days.

(21) Appl. No.: 12/419,645

(22) Filed: Apr. 7, 2009

(65) Prior Publication Data
US 2010/0227305 A1 Sep. 9, 2010

(30) Foreign Application Priority Data

Mar. 9, 2009 (EP) ..................................... 09003411

(51) Int. Cl.
*G09B 3/00* (2006.01)
(52) U.S. Cl.
USPC ......................................................... 434/350
(58) Field of Classification Search
USPC ........................................ 434/322, 323, 350
See application file for complete search history.

(56) References Cited

U.S. PATENT DOCUMENTS

| 5,204,813 | A * | 4/1993 | Samph et al. ................. 434/362 |
| 2003/0034999 | A1 | 2/2003 | Coughlin, III et al. |
| 2005/0158697 | A1 | 7/2005 | Nelson et al. |

OTHER PUBLICATIONS

European Search Report for Application No. 09003411.7 dated Aug. 7, 2009. (11 pages).
Rees, M.J. et al., "A Learning Management System to Support Face-to-Face Teaching Using the Microsoft Office System," Internet Citation, Oct. 1. 2005, retrieved by the EPO from the Internet http://epublications.bond.edu/au/infoteach_pubs/1/ on Jul. 29, 2009 (XP007909336). (8 pages).

"a) Detect file modification," Internet citation Jan. 1, 2005, retrieved by the EPO from the internet http://web.archive.org/web/20080119182454/http://www.rgagnon.com/javadetails/java-0490.html on Jul. 29, 2009 (XP007909341). (3 pages).
"Programming Excel Services Excerpts (via 1-15 Safari books online) ED—Alvin Bruney" Internet Citation Jun. 13, 2007; retrieved by the EPO from the internet http://proquest.safaribooksonline.com/9780735624078 retrieved Jul. 29, 2009 (XP007909343). (107 pages).

* cited by examiner

*Primary Examiner* — Kesha Frisby
(74) *Attorney, Agent, or Firm* — Finnegan, Henderson, Farabow, Garrett & Dunner, LLP

(57) ABSTRACT

The present description refers in particular to a computer-implemented method, a computer program product, and a computer system for processing and managing test data. The computer-implemented method for processing and managing test data may comprise:
 providing a plurality of questions for a test in a tool, the tool being located in a first shared folder;
 providing a data storage device on a second shared folder, wherein the data storage device comprises a plurality of database files, wherein each database file of the plurality of database files is assigned to a user name from a list of user names used to identify a plurality of users;
 retrieving date-times of time-stamps of the database files and assigning the date-times to the corresponding user names in the list of user names;
 if a user from the plurality of users accesses the test, providing a subset of questions from the plurality of questions to the user, wherein the subset of questions is randomly determined by making an order assignment to each of the plurality of questions, wherein the order assignment is based on random numbers associated with each of the plurality of questions;
 storing a test result of the test in a database file corresponding to a user name of the user; and
 updating the time-stamp of said corresponding database file.

10 Claims, 21 Drawing Sheets

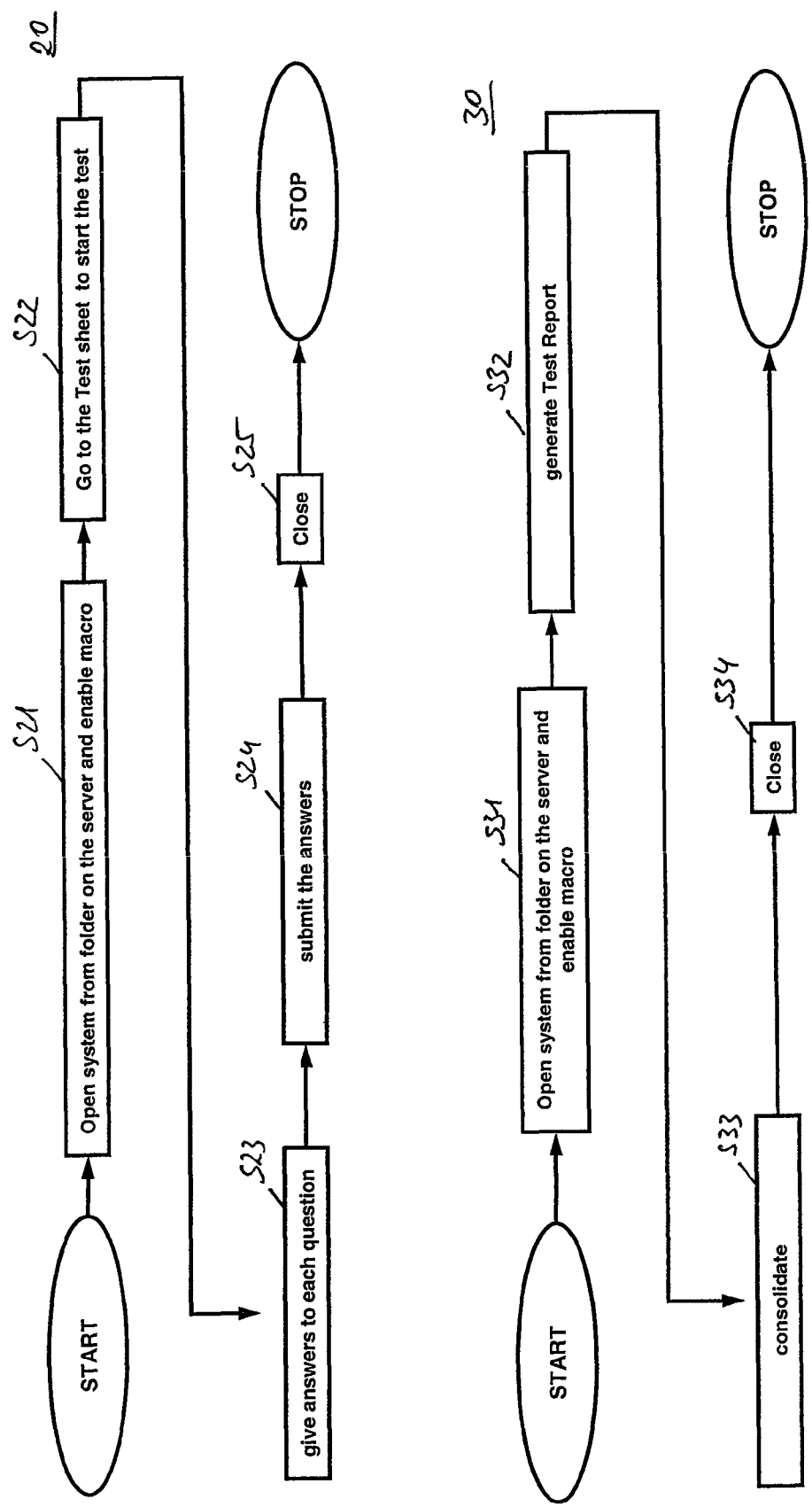

Figure 3B

| | A | B | C |
|---|---|---|---|
| 1 | Question Numbers | Question | Random Numbers |
| 2 | 1 | A man brought some watermelons to town sold them. He sold 1/2 more than 1/2 of what he brought and He was left with one melon. How many melons did he bring to town? | 0.059502 |
| 3 | 2 | When you reverse the digits of age of father u will get the age of son. One year ago the age of father was twice that of son's age. What are the current ages of father and son? | 0.517565 |
| 4 | 3 | In a class there are less than 500 students. When it is divided by 3 it gives a whole number. Similarly when it is divided by 4, 5 or 7 gives a whole number. Find the no. of students in the class. | 0.263673 |
| 5 | 4 | XXXX<br>+YYYY<br>+ZZZZ<br>———<br>=YXXXZ | 0.608776 |
| 6 | 5 | Second no: is twice the First no: and First no: is thrice the Third no. Their avg is 20. Find the greatest no. | 0.244138 |
| 7 | 6 | There is a 4 inch cube painted on all sides. This is cut down into cubes each of 1 inch. What is the no. of cubes which have no. painted sides? | 0.939444 |
| 8 | 7 | At 6'o a clock ticks 6 times. The time between first and last ticks is 30 seconds. How long does it tick at 12'o clock. | 0.523139 |
| 9 | 8 | If a clock takes 7 seconds to strike 7, how long will the same clock take to strike 10? | 0.760983 |
| 10 | 9 | In 60 reams of paper 40 reams were utilized then what percent will remain? | 0.672917 |
| 11 | 10 | In a storage stall of 5 x 3 x 2 inch, how many blankets of size 2 x 1 x 1 inch can be stored? | 0.032877 |
| 12 | 11 | A man walks from 9.15 to 5.15 from Monday to Friday and 9.00 to 12.00 on Saturday. Each day he has 45 min lunch exactly at 1:30 pm. How much time he walks in a week? | 0.150784 |
| 13 | 12 | In a class composed of x girls and y boys what part of the class is composed of girls | 0.494311 |
| 14 | 13 | If a and b are positive integers and (a-b)/3.5=4/7, then | 0.546940 |
| 15 | 14 | A school has 30% students from Maharashtra. Out of these 20% are Bombay students. Find the total percentage of Bombay in the school? | 0.667450 |
| 16 | 15 | An equilateral triangle of sides 3 inch each is given. How many equilateral triangles of side 1 inch each can be formed from it? | 0.413554 |

Figure 3C

| Question Numbers | Question | Random Numbers |
|---|---|---|
| 10 | In a storage stall of 5 x 3 x 2 inch, how many blankets of size 2 x 1 x 1 inch can be stored? | 0.032877 |
| 1 | A man brought some watermelons to town and sold them. He sold 1/2 more 1/2 of what he brought and He was left with one melon. How many melons did he to town? | 0.059502 |
| 11 | A man walks from 9.15 to 5.15 from Monday to Friday and 9.00 to 12.00 on Saturday. Each day he has 45 min lunch exactly at 1:30 pm. How much time he walks in a week? | 0.150784 |
| 5 | Second no: is twice the First no: and First no: is thrice the Third no. Their avg is 20. Find the greatest no. | 0.244138 |
| 3 | In a class there are less than 500 students. When it is divided by 3 it gives a whole number. Similarly when it is divided by 4, 5 or 7 gives a whole number. Find the no. of students in the class. | 0.263673 |
| 15 | An equilateral triangle of sides 3 inch each is given. How many equilateral triangles of side 1 inch each can be formed from it? | 0.413554 |
| 12 | In a class composed of x girls and y boys what part of the class is composed of girls | 0.494311 |
| 2 | When you reverse the digits of age of father u will get the age of son. One year ago the age of father was twice that of son's age. What are the current ages of father and son? | 0.517565 |
| 7 | At 6'o a clock ticks 6 times. The time between first and last ticks is 30 seconds. How long does it tick at 12'o clock. | 0.523139 |
| 13 | If a and b are positive integers and (a-b)/3.5= 4/7, then | 0.546940 |
| 4 | XXXX +YYYY +ZZZZ ——— =YXXXZ | 0.608776 |
| 14 | A school has 30% students from Maharashtra. Out of these 20% are Bombay students. Find the total percentage of Bombay in the school? | 0.667450 |
| 9 | In 60 reams of paper 40 reams were utilized then what percent will remain? | 0.672917 |
| 8 | If a clock takes 7 seconds to strike 7, how long will the same clock take to strike 10? | 0.760983 |
| 6 | There is a 4 inch cube painted on all sides. This is cut down into cubes each of 1 inch. What is the no. of cubes which have no. painted sides? | 0.939444 |

| Q No | Questions | Option-1 | Option-2 | Option-3 | Option-4 | Option-5 | Correct Option |
|---|---|---|---|---|---|---|---|
| 1 | A man brought some watermelons to town sold them. He sold 1/2 more than 1/2 of what he brought and he was left with one melon. How many melons did he bring to town? | 1 | 2 | 4 | 3 | | 4 |
| 2 | When you reverse the digits of age of father u will get the age of son. One year ago the age of father was twice that of son's age. What are the current ages of father and son? | 73 and 37 | 24 and 42 | 21 and 12 | 45 and 54 | | 73 and 37 |
| 3 | In a class there are less than 500 students. When it is divided by 3 it gives a whole number. Similarly when it is divided by 4, 5 or 7 gives a whole number. Find the no. of students in the class. | 340 | 420 | 210 | 400 | | 420 |
| 4 | XXXX +YYYY +ZZZZ =YXXZ | X=3, Y=1, Z=8 | X=8, Y=1, Z=7 | X=7, Y=1, Z=6 | X=6, Y=1, Z=8 | | X=5, Y=1, Z=6 |
| 5 | Second no: is twice the First no: and First no: is thrice the Third no. Their avg is 20. Find the greatest no. | 25 | 24 | 26 | 45 | | 36 |
| 6 | There is a 4 inch cube painted on all sides. This is cut down into cubes each of 1 inch. What is the no. of cubes which have no. painted sides? | 6 | 5 | 8 | 4 | | 8 |
| 7 | At 6'o a clock ticks 6 times. The time between first and last ticks is 30 seconds. How long does it tick at 12'o clock | 66 sec | 30 sec | 23 sec | 33 sec | | 56 sec |
| 8 | If a clock takes 7 seconds to strike 7, how long will the same clock take to strike 10? | 12 sec | 10sec | 10 h 1/2 sec | 12 h 1/2 sec | | 10 h 7/2 sec |
| 9 | In 60 reams of paper 40 reams were utilized then what percent will remain? | None of the given answers | 37 percent | 31.32 percent | 25 percent | | 33.32 percent |
| 10 | In a storage stall of 5 x 3 x 2 inch, how many blankets of size 2 x 1 x 1 inch can be stored? | 18 | 45 | 17 | None of the given answers | | 15 |
| 11 | A man walks from 9.15 to 5.15 from Monday to Friday and 9.00 to 12.00 on Saturday. Each day he has 45 min lunch exactly at 1:30 pm. How much time he walks in a week? | 39 hrs 45 min | None of the given answers | 39 hrs 15 min | 29 hrs | | 39 hrs 19 min |
| 12 | In a class composed of x grils and y boys what part of tha class is composed of girls | g(?=?) | ahs | g(?=?) | ghg | | ?(?=?) |
| 13 | If a and b are positive integers and (a-b)/3.5=4/7, then | b<a | b>a | b=a | b>=a | | b<a |
| 14 | A school has 30% students from Maharashtra. Out of these 20% are Bombay students. Find the total percentage of Bombay in the school? | 8 percent | 30 percent | 3 percent | 60 percent | | 6 percent |
| 15 | An equilateral triangle of sides 3 inch each is given. How many equilateral triangles of side 1 inch each can be formed from it? | 10 | 9 | 6 | 7 | | 8 |

Figure 10

| NT ID | Test Date & Time | Test Administrator | Test ID | Test Name | Test Questions | Test Duration | Test Score | I | J | K | L | M | N | O | P | Q |
|---|---|---|---|---|---|---|---|---|---|---|---|---|---|---|---|---|
| | | | | | | | | brought some watermelons to town and sold them. He sold 1/2 of what he brought and He was left with one melon. How many melons did he bring to | When you reverse the digits of age of father u will get the age of son. One year ago the age of father was twice that of son's age. What are the current ages of father and son? | there are less than 500 students. When it is divided by 3 it gives a whole number. Similarly when it is divided by 4, 5 or 7 gives a whole number. Find the n.o of students in the | XXXX -YYYY -ZZZZ ——— =YXXXZ | Second no: is twice the First no: and First no: is thiese the Third no. Their avg is 20. Find the greatest no. | There is a 4 inch cube painted on all sides. This is cut down into cubes each of 1 inch. What is the no of cubes which have no painted sides? | At 6'o clock ticks 6 times. The time between first and last ticks is 30 seconds. How long does it tick at 12'o clock. | If a clock takes 7 seconds to strike 7, how long will the same clock take to strike 10? | In 60 reams paper reams were then perce will remai |
| | | | | Correct Answers | | | | | | | | | | | | |
| ACA | | | PKTD ECOS | MMS PKT for December | ID | | | 4 | 73 and 37 | 428 | X=9, Y=3 Z=8 | 36 | 8 | 66 sec | 10 h 1/2 sec | 37 perce |
| 3 | 03-Jan-09 23:29:41 | Huzela | | | | ????? | ????? | ▢··· ▢··· | 31 and 13 | 420 | X=6, Y=1, Z=0 | 30 | ▢··· ▢··· | 23 sec | 10h 1/2 sec | |

KNOWLEDGE ASSESSMENT TOOL

CROSS REFERENCE TO RELATED APPLICATION

This application claims the priority of European Application No. 09003411.7 filed Mar. 9, 2009, the content of which is incorporated herein by reference.

TECHNICAL FIELD

The description is directed generally to data and/or information management systems and in particular to a computer-implemented method, computer system, and computer program product for processing and managing test data.

BACKGROUND

Knowledge assessment and/or test data evaluation is a cumbersome and time intensive task which often requires external databases and complex tools which can only be handled by computer experts. Most processing tools for knowledge assessment and/or test designer do not allow for self-defined sets of questions. Furthermore, questions cannot be selected at random. Beyond, existing processing tools often require external databases and incorporate the use of different data query and accessing tools. Hence, it is desirable, to provide a processing tool for knowledge assessment and/or test designer, which can be used to easily create tests (such as product knowledge tests) in a user-friendly manner, to automate a process of conducting tests, correction of papers and report generation from test results. Beyond, a high customization of such a tool would be desirable.

SUMMARY

In one general aspect, a computer-implemented method for processing and managing test data is provided. The method may comprise:
  providing a plurality of questions for a test in a (processing) tool (or software), the tool being located in a first shared folder;
  providing a data storage device (e.g. a database) on a second shared folder, wherein the data storage device comprises a plurality of database (or data) files, wherein each database file of the plurality of database files is assigned to a user name from a list of user names used to identify a plurality of users;
  retrieving date-times of time-stamps of the database files and assigning the date-times to the corresponding user names in the list of user names;
  if a user from the plurality of users accesses the test, providing a subset of questions from the plurality of questions to the user, wherein the subset of questions is randomly determined by making an order assignment to each of the plurality of questions, wherein the order assignment is based on random numbers associated with each of the plurality of questions;
  storing a test result (or an answer set corresponding to the subset of questions) of the test in a database file corresponding to a user name of the user; and
  updating the time-stamp of said corresponding database file.

The (processing) tool may be for example a knowledge assessment tool or a test designer tool. The two shared folders may be located on a server which is accessible over a (wired and/or wireless) network by one or more client computers. Users and/or administrators may access the tool from client computers. The tool may provide a plurality of functionality to the users and/or administrators by means of one or more data (or work) sheets. In one exemplary implementation, the tool may be implemented in Microsoft® Excel (one or more terms in this specification are trademarks of their respective owners) based on macros such that the data sheets provided by the tool are Excel sheets. Therefore, neither a dedicated server nor an external data storage device is required to implement and run the tool. Rather, the method may be performed using two shared folders, wherein its functionality (i.e. the tool) may be saved in one of the shared folders and the other of the shared folders may be used for storing a data storage device such as a database. The shared folders may be accessible by each user having subscribed to the tool. The data storage device may be a built-in database of the tool. Furthermore, the tool may be implemented on any computer which enables macros. Beyond, the tool and its data storage device may be provided and may be accessible online.

By providing a shared folder for the data storage device comprising a database file for each user of the plurality of users, conflicts can be avoided when different users access the database files. The handling of test results of different users becomes easier and more (time) efficient. Furthermore, when a test result of a user shell be looked up (e.g. for test report generation and/or for database clearing purposes), the date time of the corresponding user name and the time-stamp of the corresponding database file allows for a more easy and efficient finding of the corresponding database file. In fact, only those database files which comprise a change to a previous status are accessed. Accordingly, network resources may be optimized with regard to time and/or space.

By making an order assignment to each of the plurality of questions, wherein the order assignment is based on random numbers associated with each of the plurality of questions, randomization of selecting a subset of questions form the plurality of questions may be enhanced. Consequently, the subset of questions is highly randomized. In this way, a probability that a question is selected at a specific order rang in the plurality of questions is very low such that copying exactly the same test for different users becomes very difficult. In other words, when performing the test on a plurality of test persons, a probability that two of the test persons are confronted with the same subset of questions in the same order is very low. Furthermore, each time, a change is performed, e.g. a user has accessed and performed the test, a new random number can be generated for each of the questions in the plurality of questions.

According to another aspect, making the order assignment may comprise:
  ordering the plurality of questions according to their associated random numbers in ascending order.

According to yet another aspect, the method may further comprise:
  generating new random numbers for each of the questions from the plurality of questions after or once the user has accessed the test or upon the user accessing the test.

According to yet another aspect, if for a database file from the plurality of database files an associated time-stamp differs from a date time assigned to a corresponding user name, the method may further comprise:
  accessing the database file; and
  appending a test result retrieved from the database file to a test report.

According to yet another aspect, if for a database file from the plurality of database files an associated time-stamp differs from a date time assigned to a corresponding user name, the method may further comprise:

clearing and saving the cleared database file, and
retrieving an updated date-time of the time-stamp of the cleared database file and assign the updated date-time to the corresponding user name.

According to yet another aspect, directory information of the database file may be used to access the time-stamp.

According to yet another aspect, the tool is implemented in Excel.

In another general aspect there is provided a computer-program product comprising computer readable instructions, which when loaded and run in a computer system and/or computer network system, cause the computer system and/or the computer network system to perform a method as described.

In yet another general aspect, a system (such as a knowledge assessment tool or software) for processing and managing test data is provided. The system may comprise:

a first shared folder located on a server, the first shared folder comprising a tool which provides a plurality of questions for a test;
a second shared folder located on the server, the second shared folder storing a data storage device, wherein the data storage device comprises a plurality of database files, wherein each database file of the plurality of database files is assigned to a user name from a list of user names used to identify a plurality of users; and
wherein the tool is operable to:
retrieve date-times of time-stamps of the database files and assigning the date-times to the corresponding user names in the list of user names;
if a user from the plurality of users accesses the test from a client computer, provide a subset of questions from the plurality of questions to the user, wherein the subset of questions is randomly determined by making an order assignment to each of the plurality of questions, wherein the order assignment is based on random numbers associated with each of the plurality of questions;
store a test result of the test in a database file corresponding to a user name of the user; and
update the time-stamp of said corresponding database file.

The method, system, and computer program product for processing and managing test data which realize and/or implement a tool or software such as a knowledge assessment tool or a test designer tool may have one or more of the following advantages. High level of compliance with options to configure date range, time duration, and question set randomization for a test may be ensured. Due to computerized automation of test conduction and paper correction, high level of accuracy and integrity in test results may be achieved. Furthermore, it can be ensured that a test is attempted by a user only once, i.e. a user may not multiple times perform the same test. Consequently, accuracy and compliance of test data can be enhanced.

Since the method and system can be realized using Excel and at least one shared folder (i.e. in other words, neither an external database nor a dedicated server is required), an implementation may be cost effective and maintenance free.

Furthermore, a process of conduction tests, paper correction, and reporting may save non-value added effort and time, and thus leads to man-hour saving. In other words, man-machine interaction in the context of knowledge assessment is improved such that for example more than one product knowledge test may be perform in a month. Beyond paper consumption is prevented since a test is conducted using a computer-based application, which do not require any print outs. Consequently, time and resources are saved.

A high flexibility may be provided to a user, comprising a rich set of options to configure and/or customize the system (e.g. a knowledge assessment tool). The system may provide with a build in database (management) system which can be easily setup and may not require any administration. A report interface providing a one-click may capture details of test results for a test. Furthermore, the system may provide a two-level security system which authenticates users through their domain IDs. In this respect it should be noted that due to a possible Excel-based implementation, no information security or client approval may be required to implement it. A set of up to 50 freely defined questions may be provided with the system. Consequently, the method and system allow for a flexible and easy implementation, setup, and use of a knowledge assessment tool.

The subject matter described in this specification can be implemented as a method or as a system, using computer program products or a machine readable medium, tangibly embodied in information carriers, such as a CD-ROM, a DVD-ROM, a semiconductor memory, a signal and/or data stream; and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various machines.

Details of one or more implementations are set forth in the accompanying exemplary drawings and exemplary description below. Other features will be apparent from the description and drawings, and from the claims.

BRIEF DESCRIPTION OF THE DRAWINGS

FIGS. 1A to 1D show flow diagrams of exemplary methods for setting up and using a knowledge assessment tool.

FIGS. 3A to 3C show a flow diagram and screenshots of an exemplary method for randomly choosing a subset of questions from a plurality of questions for a test.

FIGS. 4A to 4C show flow diagrams and a screenshot of an exemplary method for accessing a data storage device of a knowledge assessment tool.

FIG. 6 shows an exemplary screenshot of a design sheet provided in a knowledge assessment tool.

FIG. 10 shows an exemplary screenshot of a consolidation sheet provided in a knowledge assessment tool.

DETAILED DESCRIPTION

In the following, a detailed description of examples will be given with reference to the drawings. It should be understood that various modifications to the examples may be made. In particular, elements of one example may be combined and used in other examples to form new examples.

Example implementations in Excel of (electronic) data (or work) sheets, which are provided by a tool according to the present invention and which can be used throughout the methods described in FIGS. 1A to 4C are shown in FIGS. 5A to 10.

FIGS. 1A to 1D show exemplary methods to implement and setup a tool (or a software) on a server together with a data storage device and to use said tool. The (processing) tool could be a knowledge assessment tool or a test designer tool, which could be used to ease performance of distributed tests online for a large plurality of users such as assessment of knowledge of employees in a call center, a public opinion poll, or the theoretical part of a driver's license test. Hence, man-machine interaction for handling large amounts of test data of a plurality of users can be improved, wherein a user and/or administrator is relieved from the mental task of distributing, sorting, managing and/or maintaining test data and related test results. It should be understood that the methods may be combined and that none of the described method steps is mandatory. Furthermore, additional method steps may be added.

Figure 1A:
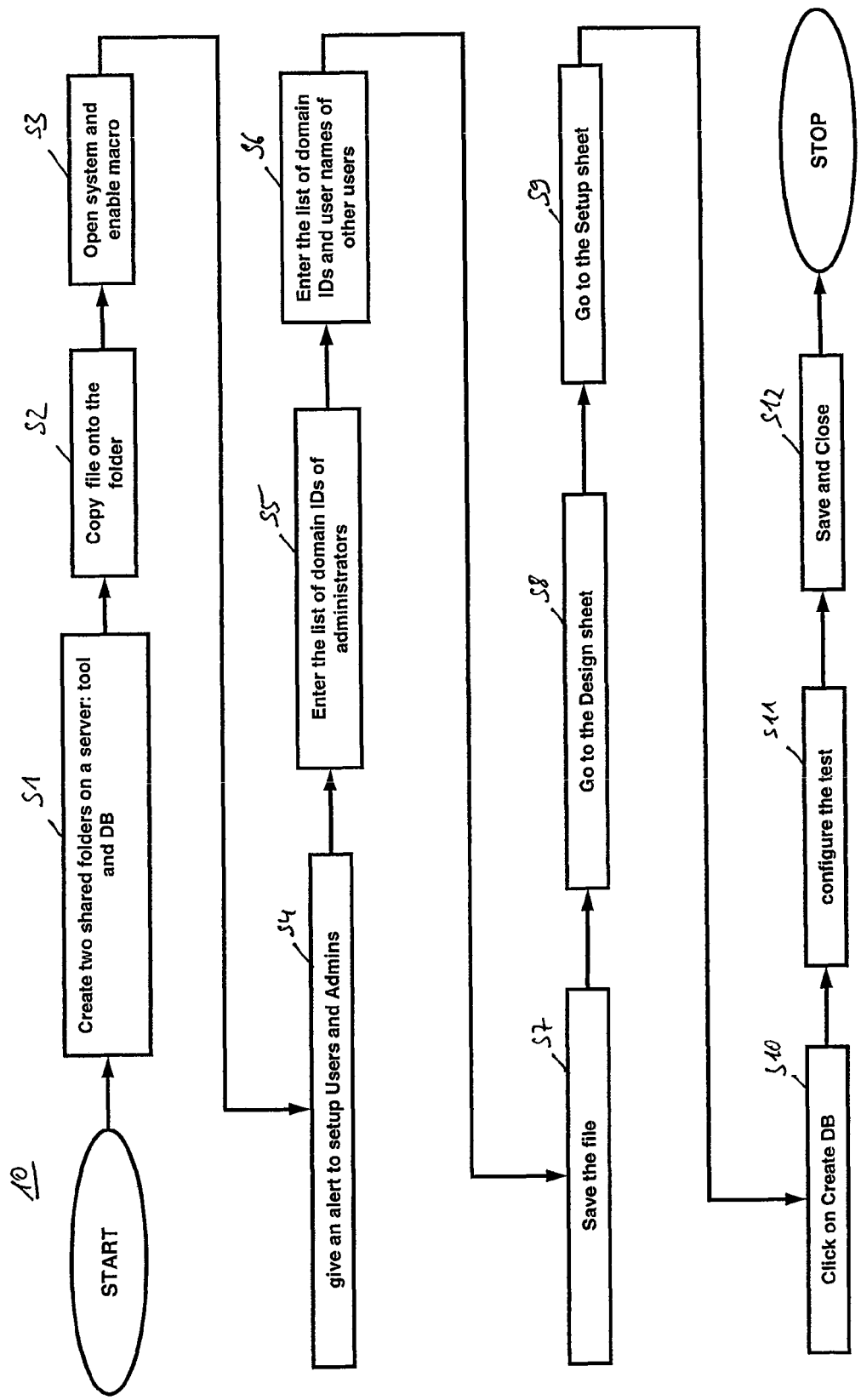

FIG. 1A shows an exemplary method 10 to set up the tool and to design test data or a test comprising a plurality of questions, which may be freely defined by at least one administrator and/or by at least one user. Within the tool a maximal number of questions definable for a test may be determined. The tool particularly runs on a single server. No further dedicated server is required to setup and run the tool. In step S1, after having accessed a server, a system user such as an administrator creates (substantially) two shared folders on the server. One of the shared folders may be used to store the tool itself and the other of the shared folders may be used to host a data storage device such as a database for saving and storing test data and/or test result data (e.g. test results or answer sets) of one or more users having subscribed to the tool. Then at S2, the administrator copies (a directory of) the tool into the first shared folder. In one exemplary implementation, the administrator creates the shared folders and copies the tool into one of the shared folders using Microsoft Excel, e.g. version 97 or newer (in the following referred to as Excel). Accordingly, the tool may be setup using Excel. At S3, the administrator opens the tool and when prompted to him from a system within which the tool shell be setup, enables macros supported by the underlying system. The administrator receives an alert from the tool at S4 to register and/or setup one or more users and one or more administrators. The alert may be prompted to the administrator in a (electronic) data (or work) sheet, which may be a specific sheet for the administrator, e.g. an Admin sheet. At S5, the administrator may enter on or more domain identifiers (IDs) of each of the administrators in a dedicated column of the data sheet, e.g. an Admin Users column, as well as its own domain ID. The domain IDs of the one or more administrators may be stored in a list. At S6, the administrator enters into the data sheet in a second column dedicated to other users, e.g. a All Users column, one or more domain identifiers (IDs) of one or more users registered to the tool. Furthermore, a user name may be entered for each of the users. The users may be thus handled in a user list, i.e. a list of a plurality of user names. The users may be those who will take a test at the tool. At step S7, the administrator saves the entries made into the data sheet and confirms the data entries made. After having confirmed the data entries, the administrator will be able to see and access further data sheets provided by the tool such as an INTRO sheet, a Setup sheet, an Admin sheet, a Consolidation sheet, a Design sheet, and/or a Test sheet. At step S8, the administrator may access the Design sheet and enters one or more questions for a test. The questions can be freely defined. Furthermore, objective type options and/or correct answers to each of the questions may be specified in the Design sheet. Then at S9, the administrator may access the Setup sheet provided by the tool and specify a path (such as a server path) to locate the shared folder for the data storage device. Said path may be entered into a column of the Setup sheet as a value of a type or key which could be referred to by "DB Path". Having finished such data entries into the Setup sheet, the administrator may activate (e.g. by clicking) a button (e.g. a Create DB button) at step S10 to start or activate a process of automatically creating a data storage device. The data storage device may be created by allocating a storage area in the shared folder dedicated for said device. At S11, the administrator may enter additional values to further types and/or keys specified in the Setup sheet. Finally, at S12, the administrator saves and closes the Setup sheet and the tool.

FIG. 1B shows an exemplary method 20 of performing or giving a test on the tool. A user, having accessed the server to run the tool and the data storage device, opens at S21 the shared folder holding the tool and enables one or more macros when prompted or requested by the system. At step S22, the user accesses a data sheet, e.g. a Test sheet provided by the tool. The Test sheet may comprise a button (e.g. a Start/Submit button) to start the test on the tool. The user selects one or more objective type options in a column for answers (e.g. Answer column) at S23 in order to give an answer to at least some of the questions provided when starting the test in the Test sheet. The objective type options may comprise a list for a multiple choice to choose one answer to a question, e.g. from a set of possible answers, a range of values, and/or a task bar. At S24, once the user has given at least one (preferably all) answers to each of the questions of the test, he/she activates a button to submit the answers (e.g. by clicking on a "Start/Submit" button providing with the Test sheet). Then the user closes the Test sheet and the tool at S25. The answers given by the user to the questions of the test may specify an answer set and a corresponding test result. The answers may be stored in the data storage device.

FIG. 1C shows an exemplary method 30 to generate a test report from one or more answer sets and/or test results obtained from one or more users having given the test on the tool according to the method 20 shown in FIG. 1B. At S31 an administrator opens the tool from the corresponding shared folder at the server and enables one or more macros when prompted by the tool. The administrator accesses the Admin sheet at S32 and activates a button to generate the test report (e.g. by clicking on a Consolidate button provided with the Admin sheet). At step S33, the administrator accesses a Consolidation sheet provided by the tool and copies the test report into a new data sheet. In case the tool is setup in Excel, the administrator creates a new Excel file and copies the test report into said file. Subsequently, at S34, the administrator closes the tool.

Figure 1D:
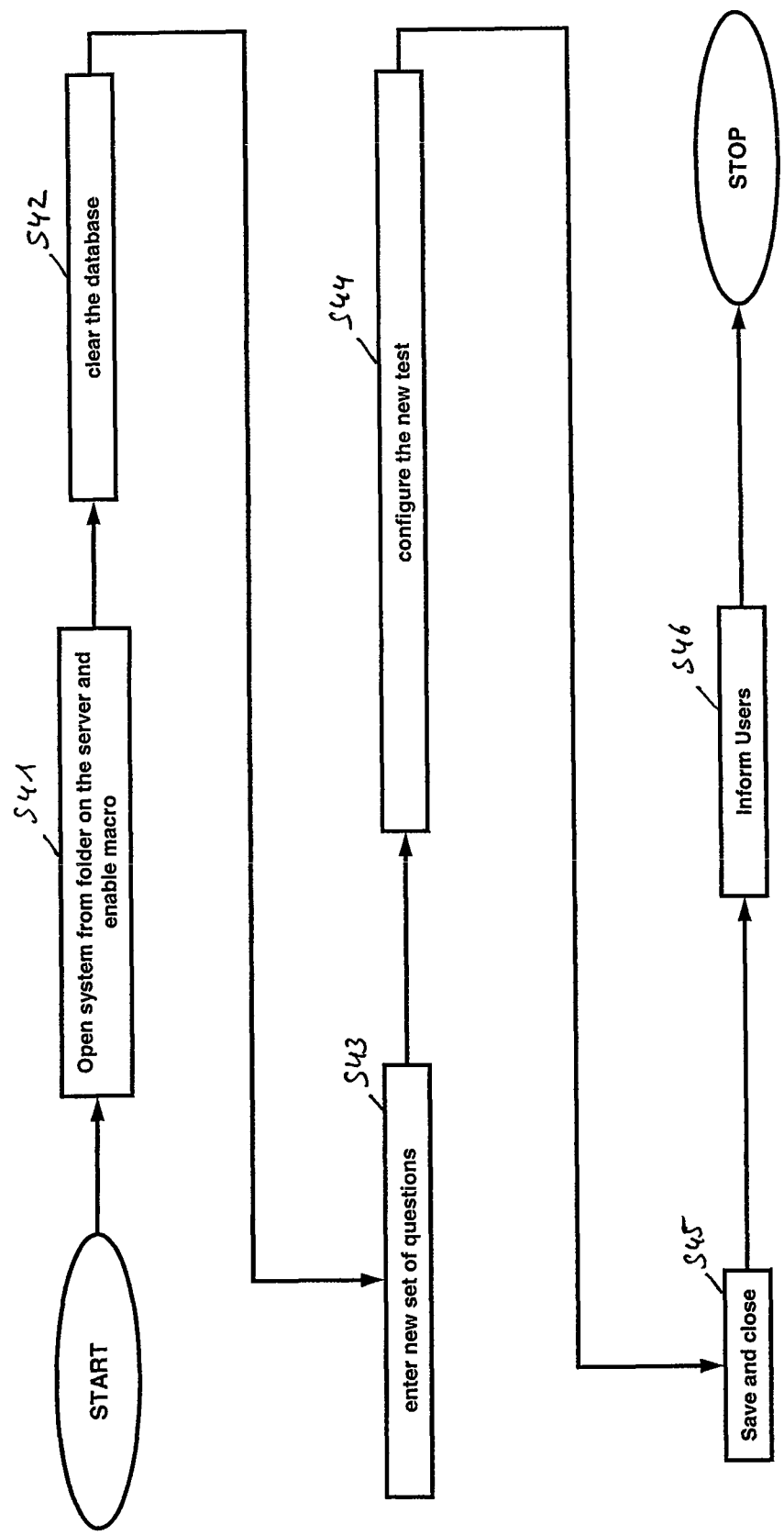

FIG. 1D shows an exemplary method 40 to clear the data storage device in the corresponding shared folder of the server and to design and/or to create a new test on the tool. At step S41, an administrator opens the tool from the corresponding shared folder on the server and enables one or more macros when prompted by the tool. The administrator accesses and opens the Admin sheet and activates a respective button to clear at step S42 the data storage device, e.g. by clicking on a Clear DB button provided in the Admin sheet of the tool. Then, at step S43, the administrators accesses and opens the Design sheet provided by the tool. The administrator specifies a plurality of new questions for a new test, e.g. by entering one or more freely defined questions along with respective objective type options and/or correct answers. At S44, the administrator accesses and opens the Setup sheet. The administrator may perform one or more changes to one or more values of the keys supported by the Setup sheet in order to configure the new test. For example, if the administrator has changed the value for the DB Path key and/or a list of one or more user names of users having subscribed to the tool, e.g. by deleting and or adding user names, the administrator also activates the process of creating a new data storage device on the corresponding shared folder, e.g. by clicking on the Create DB button. The administrator saves the changes made on the tool and closes the session at S45. Finally, at step S46, the administrator informs, e.g. via email, the one or more users listed in the list of user names for the new test.

Figure 2:
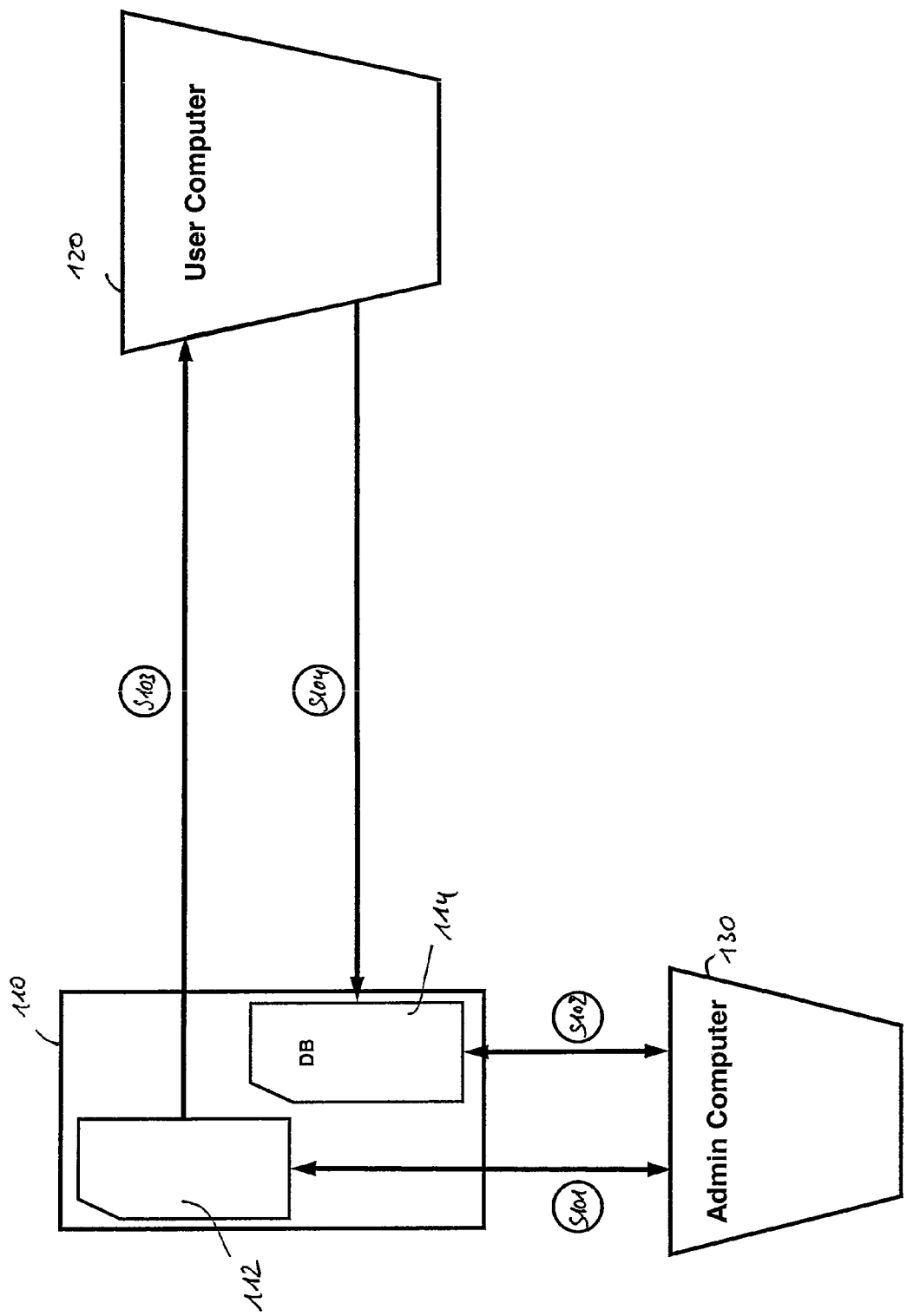
FIG. 2 shows a block diagram of an exemplary (system) architecture of a knowledge assessment tool.
Figure 7:
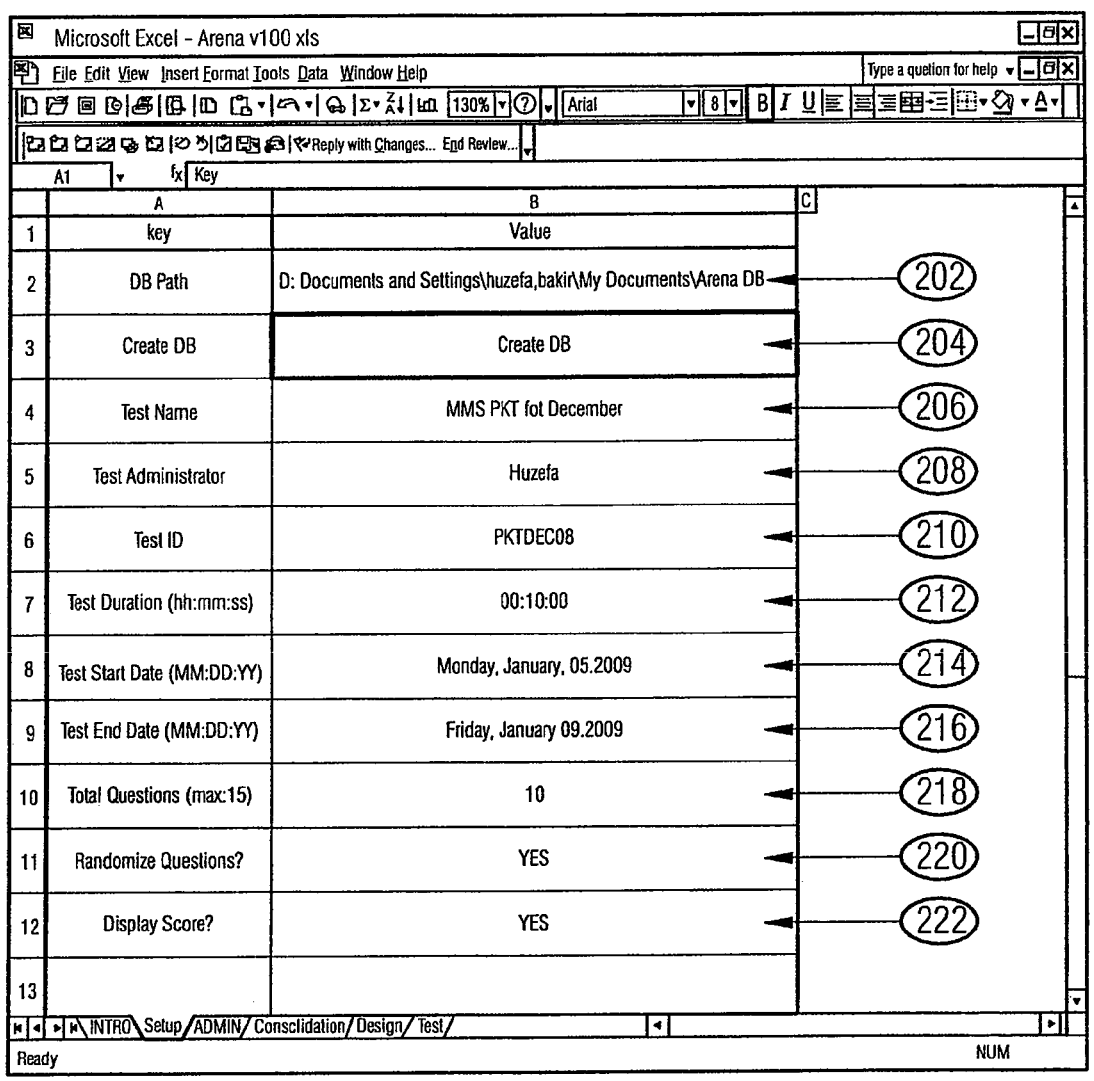
FIG. 7 shows an exemplary screenshot of a setup sheet provided in a knowledge assessment tool.

FIG. 2 shows an exemplary architecture or system for setting up and/or running the tool. The system may comprise a server 110 connected with at least one work station or client computer 120, 130 such as a computer 130 operated by an administrator and connected with at least one work station or client computer 120 such as a computer operated by a user. The server 110 and the client computers 120, 130 may be connect via a (wired or wireless) network. The server 110 hosts a shared drive comprising at least two shared folders 112, 114. One 112 of the shared folders 112, 114 is used to host and/or store the tool and the other 114 of the shared folders is used to host and/or store a data storage device. Arrows between the server 110 and the at least two client computers 120, 130 may signify a possible flow of data between the client computers 120, 130 and/or the server 110. For example, at S101, an administrator may run the tool from its corresponding shared folder 112 on the server 110, design a plurality of questions for a test and/or configure or setup settings on a corresponding data sheet (e.g. a Setup sheet as shown in FIG. 7) for the test. At S102, for example, the administrator may create a data storage device (e.g. a database) on the corresponding shared folder 114 and/or may create or generate test reports from answer sets and/or test results obtained from one or more users, who have performed the test. At S103, for example, a user working on the client computer 120 may access and/or run the tool from the corresponding shared folder. Furthermore, the user may load the questions for the test on his/her client computer 120. At S104, for example, the user may submit one or more answers to the questions of the test to the data storage device located in the corresponding shared folder 114 on the server.

Figure 3A:
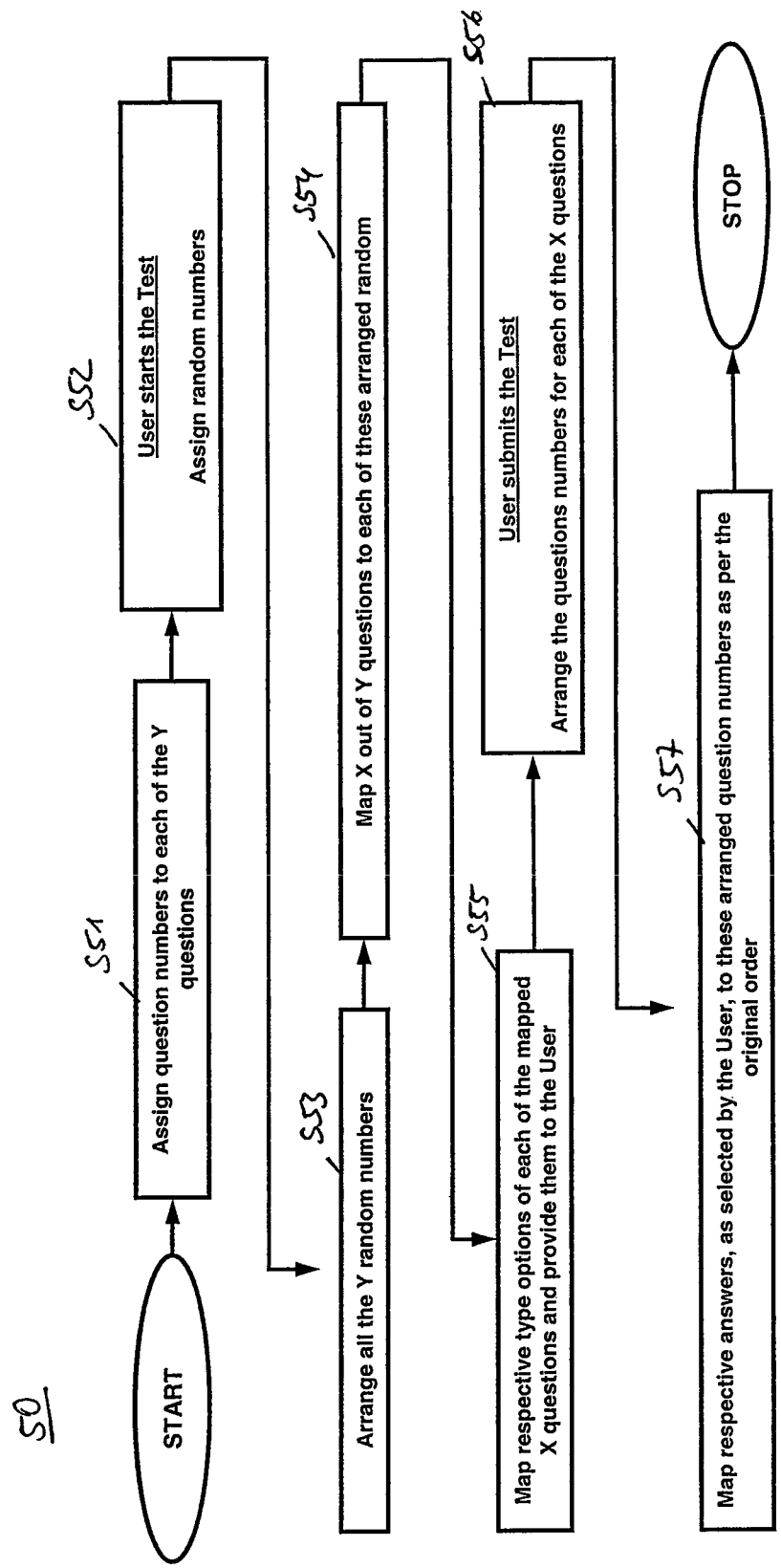

FIGS. 3A to 3C show an exemplary method 50 for randomizing questions for a test as well as a possible implementation of the method 50 in Excel. The method 50 may be performed internally by the tool when any one of the methods 10, 20, 30, 40 as shown in FIGS. 1A to 1D is performed. It should be understood, that none of the shown method steps is mandatory.

FIG. 3A shows the exemplary method 50 for a question set randomization algorithm. Questions as e.g. defined by an administrator when creating and/or designing a test in the tool, may be plain text. Consequently, picking or selecting questions from a set (i.e. a plurality) randomly may be much more difficult than selecting numbers and/or characters at random. A plurality of questions may be stored in a question bank at the shared folder holding the tool.

The method 50 shown in FIG. 3A may handle one or more of the following challenges. The method 50 may be able to randomly select (or pick) a predefined number of questions, i.e. a subset of questions from the plurality of questions. The method 50 may be further able to shuffle or rearrange the randomly selected subset of questions before posing them to a user. Additionally, the method 50 may be further able to de-shuffle corresponding answers given by a user to the selected subset of questions, before said answers are submitted to the data storage device, such that said answers can be retrieved in the original order of the questions as defined when the test and its related questions have been setup. In the example shown in FIG. 3A, it is assumed that the plurality of questions comprises a number of Y questions of which a subset of X questions is randomly picked out and posed to a user making or conducting or performing a test.

At step S51, (consecutive) numbers (e.g. positive integers), referred to hereinafter as question numbers, are given or assigned to each question in a plurality of questions (e.g. Y questions) and their corresponding answer options (i.e. objective type options) in the ascending order as the questions are entered (e.g. on a Design sheet of the tool) when a test is designed. At S52, when a user starts the test, a random number is assigned to each of the questions in the plurality of questions. The random numbers may be computed using any known random number generator. A random number may be any real number within the open interval or range of 0 to 1. At S53, an order assignment is made to the questions according to their associated random numbers. For example, the corresponding random numbers of each of the questions are ordered in ascending (or descending) order such that the question having assigned thereto the smallest (or largest) random is the first of the Y questions and the question having assigned thereto the largest (or smallest) random number is the last of the Y questions ordered according to their random numbers. At S54, a subset of questions is mapped out or assigned of the plurality of questions per the order assignment made to each of the questions in the plurality of questions. In this way, for example X out of Y questions are selected at random, shuffled and then presented to the user, who has accessed to the test. At S55, respective answer options to each of the questions in the selected subset are selected or mapped and provided to the user performing the test. When the user has submitted the test in the tool, at S56, the questions from the selected subset of questions is displayed to the user in the ascending (or descending) order. After the user has finished the test, at S57, the respective answers given by the user are mapped to the subset of questions arranged in the original order of the plurality of questions according to their question numbers (i.e. in the order the questions have been designed). In said original order, the answers are then stored in the data storage device 114. In one exemplary implementation, the answers are stored in a database file of the data storage device assigned to the user having performed the test. In this way, the answers to the selected subset of questions may be de-shuffled before they are saved and stored in the data storage device. Hence, it may be ensured, although the subset of questions has been selected randomly, that the answers given by the user are properly mapped to their respective questions from the plurality of questions.

By randomizing the plurality of questions and selecting a subset of questions from said plurality using the method 50 shown in FIG. 3A, randomization is enhanced such that it can be ensured that no two users will answer the same subset of questions of a test in the same order. Using the described randomization algorithm, a probability that a question out of the plurality of questions is selected at a specific order place is very low. Consequently, copying the test for different users becomes very difficult or almost impossible. Furthermore, whenever something is changed in the tool, e.g. a user has performed a test, new random numbers are created and assigned to each of the plurality of questions.

FIGS. 3B and 3C show an example data sheet (e.g. a Design sheet for a test using Excel) before (FIG. 3B) and after (FIG. 3C) the method 50 as shown in FIG. 3A is applied to a plurality of questions in the data sheet.

Column A of FIG. 3B shows question numbers 1 to 15 assigned in ascending order to each of the questions from the plurality of questions reflecting the order of the questions in which the questions for a test are defined. Said order may be referred to as a original order of the plurality of questions. The tool then automatically generates and assigns random numbers to each of the questions. The random numbers assigned to each of the questions are shown in column C. In one exemplary implementation, the random numbers computed by the tool for the plurality of questions are neither displayed to an administrator nor to a user. Any known random number (e.g. a random number generator supported by Excel) can be used to generate the random numbers. In one exemplary implementation, random numbers generated by the random number generator are copied into the data sheet comprising the questions. In this way, once the random numbers are copied, they are saved with the questions such that the random numbers for the questions are not changed such that an unambiguous association between the random numbers and the questions may be ensured for a session (i.e. during the time a user is operating on the questions). The initial setup of question numbers and random numbers assigned to each of the questions is used by the tool to shuffle and to de-shuffle questions from the plurality of questions to users and to store corresponding answers in the correct (right) order, i.e. the original order of the plurality of questions according to their question numbers in the data storage device. In one implementation, for each user listed in a user list of the tool, a database file is created in the data storage device.

As shown in FIG. 3C, the random numbers are sorted in ascending order such that the questions are re-arranged and sorted according to an order assignment made by sorting the random numbers in ascending order. In other words, the questions are re-mapped to the new order defined through the order of their associated random numbers. Then a subset of questions (e.g. 10 out of the 15 questions) are selected to be posed to a user performing the test. Therefore, the above method steps as explained with regard to the example of FIGS. 3B and 3C support in randomly picking out or selecting a subset of questions (e.g. 10) from a plurality of questions (e.g. 15) of a test and shuffle or re-arrange the subset before posing the selected subset of questions to a user.

In other words, the method 50 for question set randomization may be very effective in giving unique question sets to every user who attempts or performs a test on the tool.

Figure 4A:
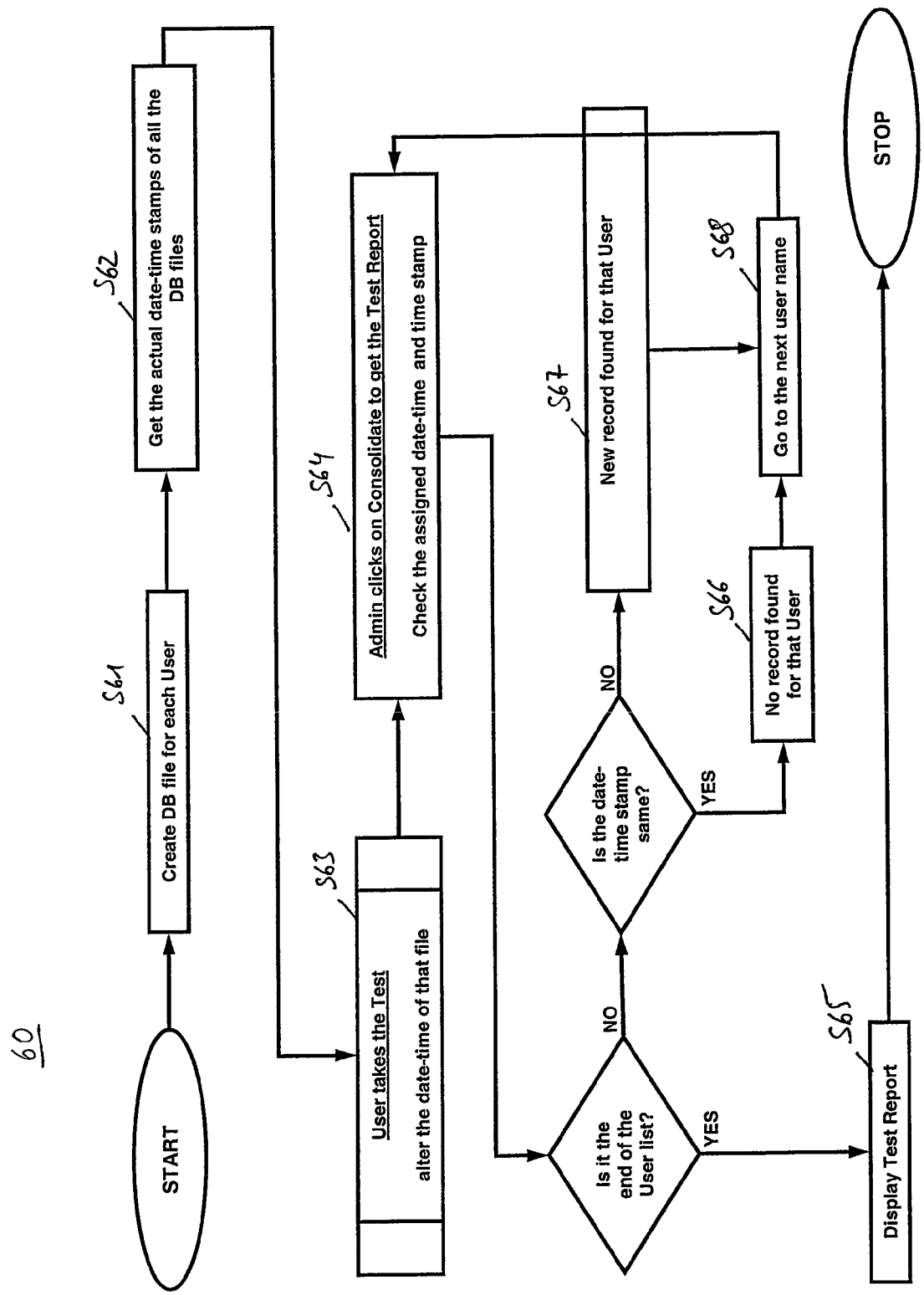
Figure 4B:
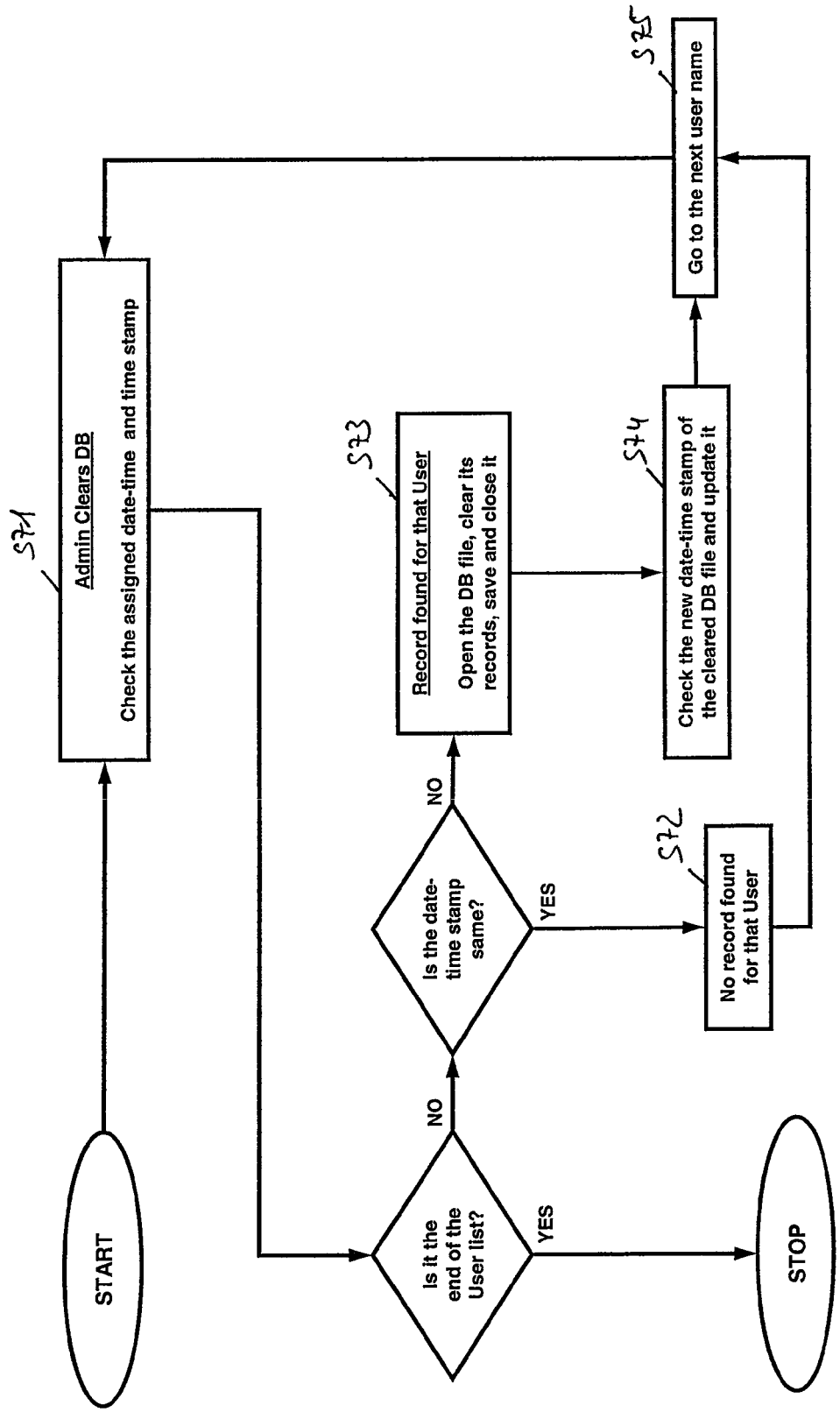
Figure 4C:
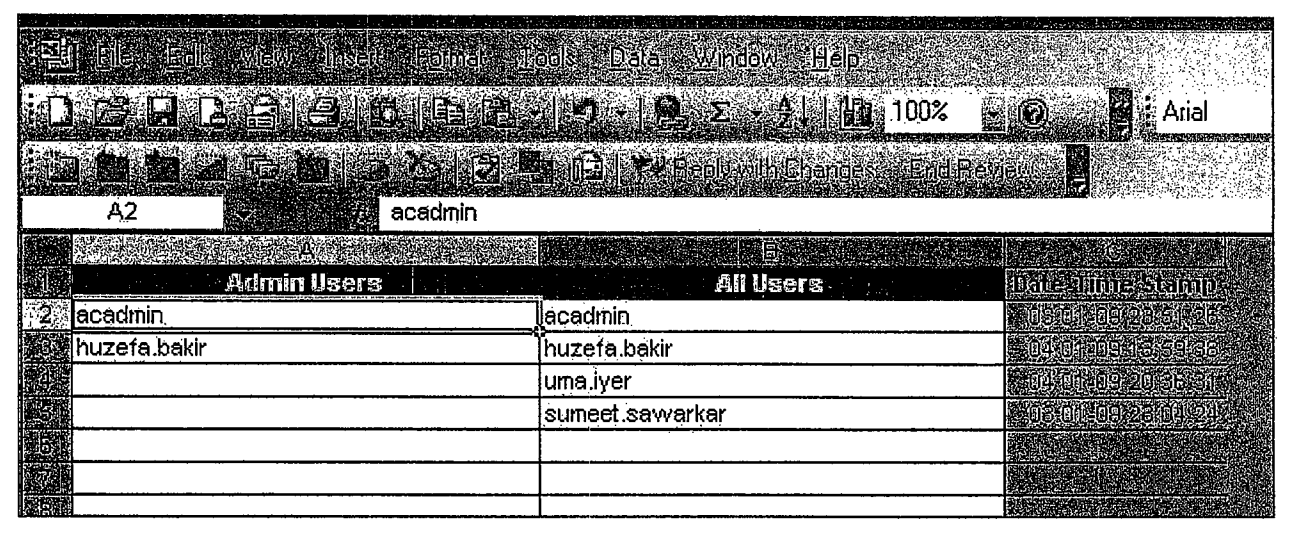

FIGS. 4A to 4C show exemplary methods 60 and 70 for an optimized access and clearing process of the data storage device of the tool. It should be understood that said methods 60 and 70 may be combined with any of the other methods 10, 20, 30, 40, 50. Furthermore, none of the method steps shown in FIGS. 4A and 4B is mandatory. Furthermore, the methods 60 and 70 are performed internally by the tool when an administrator or a user accesses and operates on the tool, e.g. when any one of the methods 10, 20, 30, 40 are performed.

As shown with reference to FIG. 2, the server 110 comprising a shared drive hosts the tool in one shared folder 112 and a data storage device such as a built-in database in a second shared folder 114. The data storage device may be such that each user, who is registered in the tool, has a corresponding database file on the shared folder 114. Users being registered may have an assigned user ID and a user name listed in a user list of a data sheet of the tool.

Providing a database file for each user may ensure that users do not trigger access conflicts when attempting a test on the tool simultaneously. Therefore, the method 60 may be confronted with the following problems and/or challenges. When consolidating test results (e.g. when generating a test report on different answer sets), every database file of the data storage device on the server needs to be opened to check if there is any data in it and then closed. When clearing the data storage device to enable future attempts on a test, or after a new test is created, every database file of the data storage device on the server needs to be opened to check if there is any data in it and then closed. For example, if 1000 users are registered on the tool and only 20 of them have attempted a test, still each of the 1000 corresponding database files will have to be accessed on the server to generate a test report and/or to clear the data storage device. Hence, this might significantly increase time and network traffic. Such a drawback may arise because there exists no direct way for the tool to know (or register) which of the users have attempted a test.

The methods 60 and 70 shown in FIGS. 4A and 4B overcome said drawbacks by using an improved algorithm of determining which of a plurality of users have attempted a test and submitted corresponding answer sets or test results. The methods 60 and 70 increase efficiency with regard to time and require less network traffic and less computing time. In general, the methods 60 and 70 advantageously employ time-stamps of database files to confirm file alternations in a data storage device on the server.

FIG. 4A shows the exemplary method 60 of a data storage device creation and test report generation cycle. At S61, an administrator activates a process of generating a data storage device for the tool in a shared folder on the server hosting also the tool in another shared folder. This may be done by clicking on a Create DB button in a data sheet provided by the tool. When creating the data storage device, the tool creates a database file for each user listed in a user list of the Admin sheet of tool. The Admin sheet may be accessed and filled in by the user when setting up the tool e.g. at step S6 when performing method 10 as shown in FIG. 1A. Users can be identified in the user list by their associated user domain IDs and/or by their associated user names. At S62, the administrator retrieves time-stamps of each of the database files from the server where the data storage device is located. Subsequently, the administrator assigns a date-time retrieved from the time-stamps to each of the corresponding user names in the user list. Alternatively, a date-time may be automatically retrieved from the time-stamps from the database files and assigned to each of the corresponding user names in the user list. At S63, when a user has performed the test and submitted a test result (or an answer set) to his/her corresponding database file (e.g. steps S22 to S24 of method 20 shown in FIG. 1 B), the tool automatically alters the time-stamp of said database file on the server. The administrator may activate the test report generation for the test (e.g. by performing steps S32 and S33 of method 30 shown in FIG. 1C). If the administrator has not yet reached the end of the user list, the time-stamp of a database file is checked against the date-time assigned to the corresponding user name in the user list (S64). If the date-time of the user name and the time-stamp of the corresponding database file are the same, no data (e.g. an answer set or a test result) could be found in the corresponding database file (S66). In this case, said database file is not accessed. The time-stamp of the database file can be retrieved by looking up corresponding directory information of the data storage device. Consequently, the data storage device advantageously is not to be accessed in order to determine time-stamps of database files stored in the data storage device. If however, the date-time of the user name and the time-stamp of the corresponding database file deviate (e.g. the time-stamp of the database file is newer than the date time assigned to the user name in the user list), the corresponding database file is accessed and a test result or an answer set is retrieved and appended to a test report (S67). Subsequently, the database file is closed. Then the next user name in the user list is considered (S68) in (substantially) the same manner, i.e. by comparing a date time of the user name and a time-stamp of a corresponding database file. When the end of the user list is reached, the test report comprising test results from those users having performed (or attempted) the test is generated and displayed to the administrator (S65).

FIG. 4B shows the exemplary method 70 of a data storage device clearing cycle. At S71, an administrator may activate a data storage device clearing process (e.g. by performing steps S42 to S44 of method 40 shown in FIG. 1D). This may be done by clicking on the Clear DB button provided in the Admin sheet. If the administrator has not yet reached the end of a user list on the Admin sheet, the time-stamp of a database file is checked against the date-time assigned to the corresponding user name in the user list (S71). If the date-time of the user name and the time-stamp of the corresponding database file are the same, no data (e.g. an answer set or a test result) could be found in the corresponding database file (S72). In this case, said database file is not accessed. If however, the date-time of the user name and the time-stamp of the corresponding database file deviate (e.g. the time-stamp of the database file is newer than the date time assigned to the user name in the user list), the corresponding database file is accessed, its records are cleared and saved (S73). Subsequently, the database file is closed. Then a new time-stamp of the cleared database file is checked and its date-time is assigned to the user name of the corresponding user in the user list. In other words, the date time of the corresponding user in the user list is updated in accordance with the time-stamp of the cleared database file (S74). Then, the next user name in the user list is considered in (substantially) the same manner, i.e. by comparing a date time of the user name and a time-stamp of a corresponding database file until the end of the user list is reached (S75).

The methods 60 and 70 may be performed subsequently or in combination. When the methods 60 and 70 are performed subsequently, each database file comprising new data is read out and its content is appended to a test report. If the test report is generated from all test results, each database file which has been accessed is cleared in the described manner according to the method 70. When the methods 60 and 70 are performed in combination, for example, every database file which is read out (e.g. by appending a comprised test result to a test report), said database file is subsequently cleared.

Consequently, performing methods 60 and 70 subsequently and/or in combination significantly reduces access times to the data storage device on the server, in particular, in case when only few out of a plurality of users have performed a test on the tool.

FIG. 4C shows the exemplary user list in an Admin sheet of the tool using Excel. For example, the user names listed in column B comprise last recorded date times of time-stamps of the corresponding database files as listed in column C. Said date times can be used to compare them to actual time-stamps of corresponding database files in the data storage device in order to confirm which of them have been changed (or altered) after a previous clearing and/or setting up cycle of the tool and/or its related data storage device. As already explained with reference to FIGS. 4A and 4B, only those database files are to be (physically) accessed and actually opened, which have been altered. Time-stamps of database files can be accessed by reading out corresponding directory information from the directory of the data storage device.

FIGS. 5 to 10 show exemplary screenshots of (electronic) data sheets (or work sheets) provided with the tool when implemented in Excel. Any of the exemplary data sheets can be used throughout the previously described methods 10, 20, 30, 40, 50, 60, and 70.

Figure 5A:
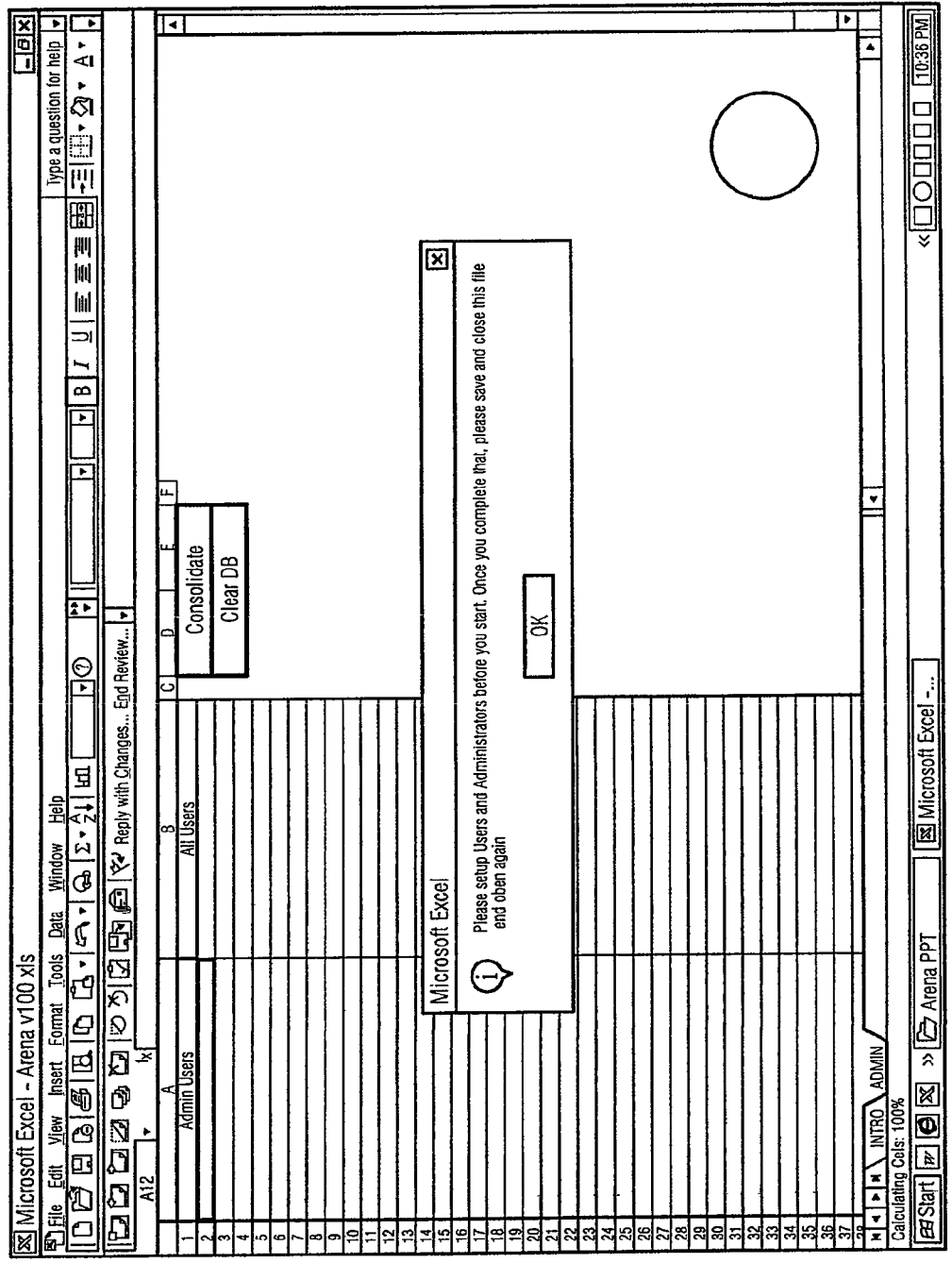
FIGS. 5A to 5C show exemplary screenshots of admin sheets provided in a knowledge assessment tool.
Figure 5B:
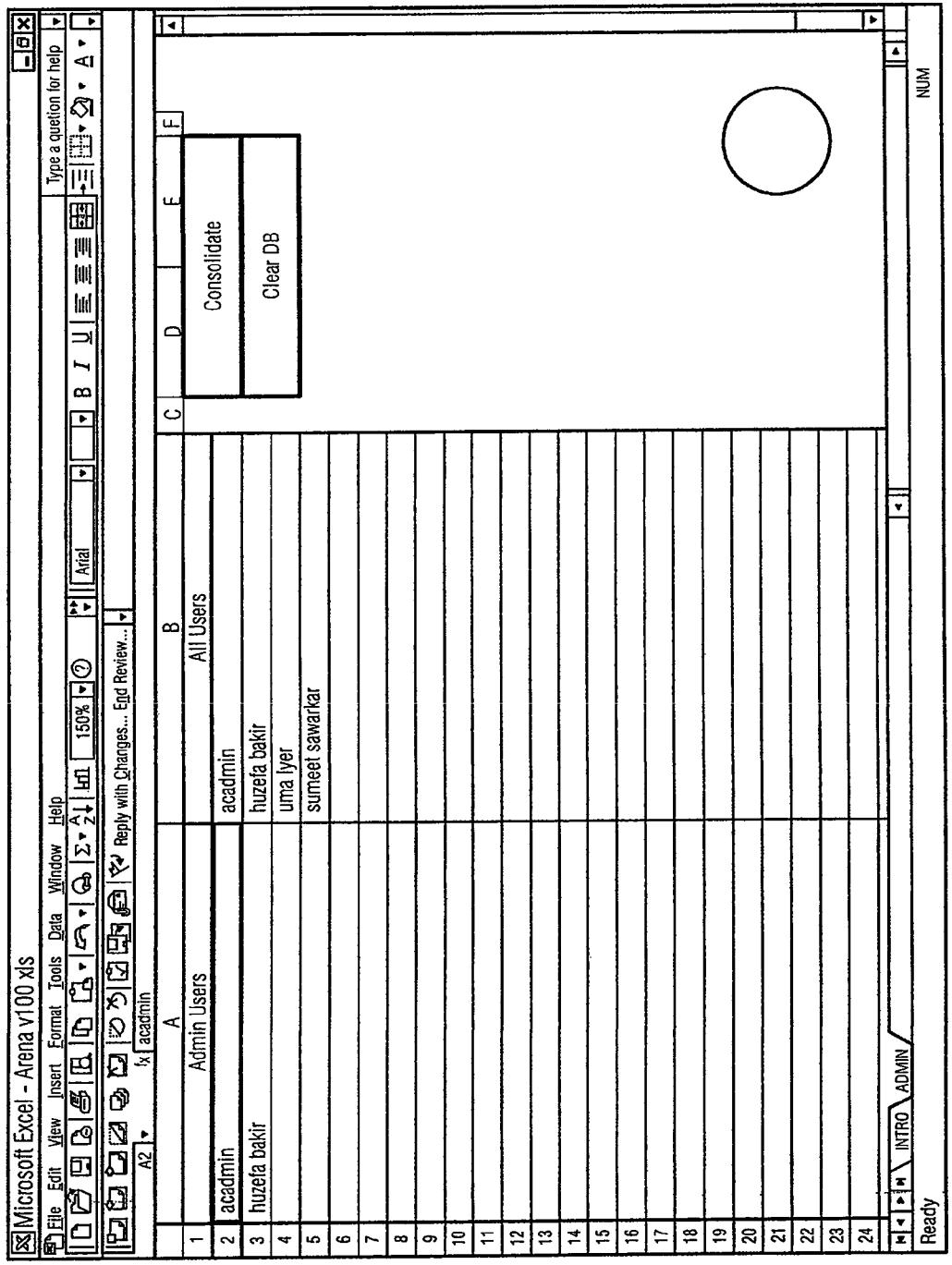
Figure 5C:
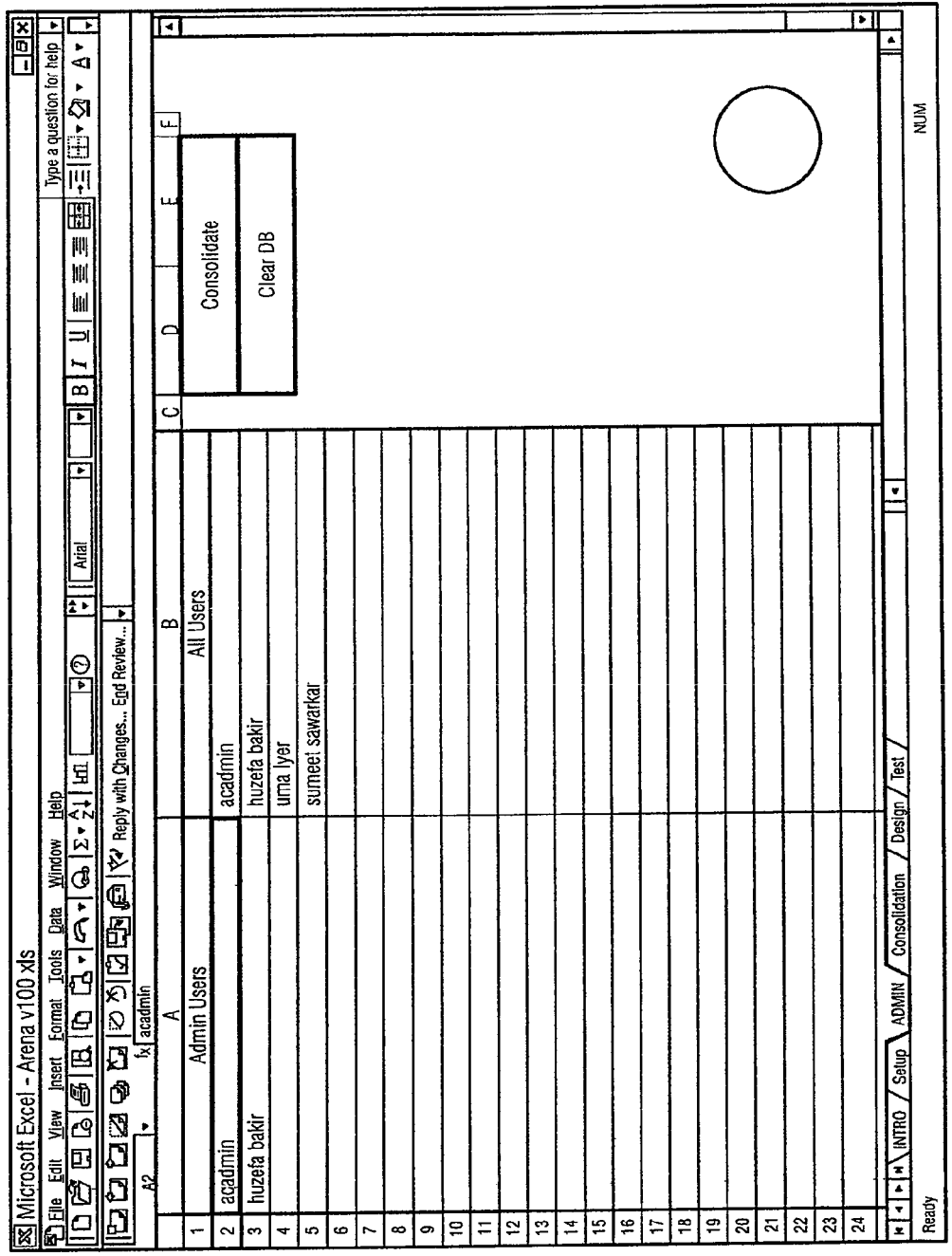

FIG. 5A to 5C show exemplary data sheets of an Admin sheet to setup users and administrators and to generate test reports. When running the tool for the first time, an administrator is directly directed to an Admin sheet. FIG. 5A shows an exemplary Admin sheet where the tool gives alert to setup administrators and users. FIG. 5B shows an exemplary Admin sheet where domain IDs of administrators are entered into column A and user names of users (registered to the tool) are entered in column B. FIG. 5C shows an exemplary Admin sheet when saving the data sheet. After having saved the data sheet, further data sheets to configure the tool are automatically presented to an administrator setting up the tool. The buttons on the right of the exemplary Admin sheet may be used for generating test result reports ("Consolidate") and clearing an associated data storage device of the tool ("Clear DB").

FIG. 6 shows an exemplary Design sheet provided by the tool. As shown in column A, question numbers associated to designed questions of a test cannot be modified. Rather the questions numbers are assigned automatically to each of the questions in ascending order, whenever new questions are entered in column B. Column B hence shows exemplary actual questions of a test, which can be posed to a user, who performs the test. Columns C to G show exemplary objective type options (e.g. a multiple choice list of answers, including the correct answer, to a question) for each of the questions, which may be presented to a user as optional answers when performing the test. Column H show the corresponding correct answer to each of the questions. The correct answer to a question may be a drop-down to be selected from the objective type options of columns C to G of the corresponding question.

FIG. 7 shows an exemplary Setup sheet provided by the tool. Column A shows a list of keys which can be specified by corresponding values in order to setup the tool and a test on the tool. Exemplary values to each of the keys are shown in Column B, and denote the following:

A path 202 to the shared folder where the data storage device will be located and stored on the server.

A button 204 to create a new data storage device on the shared folder path 202, wherein said button 204 may be used when one or more domain IDs of corresponding administrators and/or users have been changed in an Admin sheet and/or when the path 202 to the data storage device is changed.

A name 206 of a test which may be conducted, wherein said name may reflect in the INTRO sheet and the Test sheet provided by the tool.

An author or test administrator 208 who has designed the test and/or configured the tool on a server, wherein the author 208 may reflect in a Test sheet provided by the tool.

An ID number 210 of the test, wherein the ID number 210 may reflect in an INTRO sheet and/or a Test sheet.

A test duration 212 determining a duration of the test when performed, e.g. entered in the format HH:MM:SS (hour-minute-second).

A starting date 214 of a test, e.g. in the format MM/DD/YY (month-day-year).

An ending (or expiration) date 216 of a test, e.g. in the format MM/DD/YY (month-day-year).

A number of questions 218 from the test to be posed to a user (i.e. a number of questions in a subset of questions), when the user performs the test.

A randomization flag 220 which provides an option to turn on or of a question set randomization algorithm (e.g. method 50 shown in FIG. 3A).

A user score flag 222 which provides an option to turn on or off a score display when a user has submitted his/her answers to the test.

Figure 8:
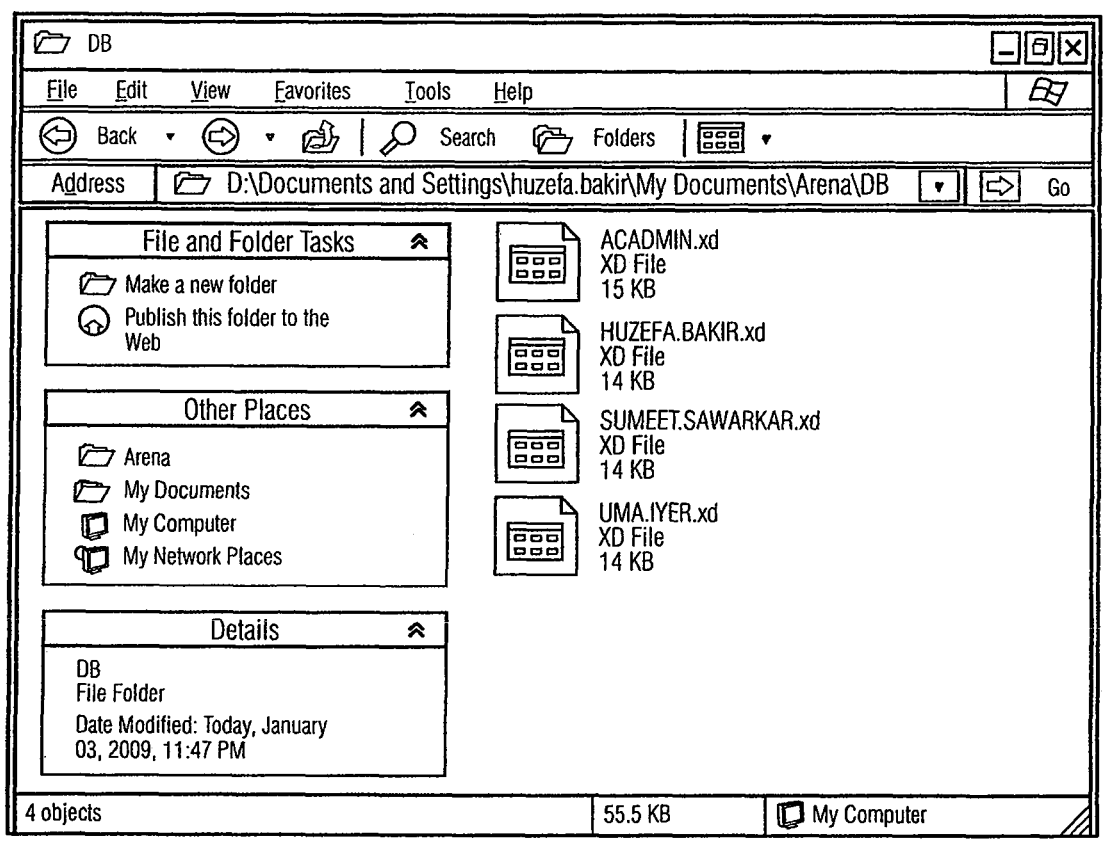
FIG. 8 shows an exemplary screenshot of a database folder of a knowledge assessment tool.

FIG. 8 shows an exemplary shared folder for a data storage device of the tool which shows that each user may have a dedicated (or corresponding) database file which may be reflected in the user's folder.

Figure 9A:
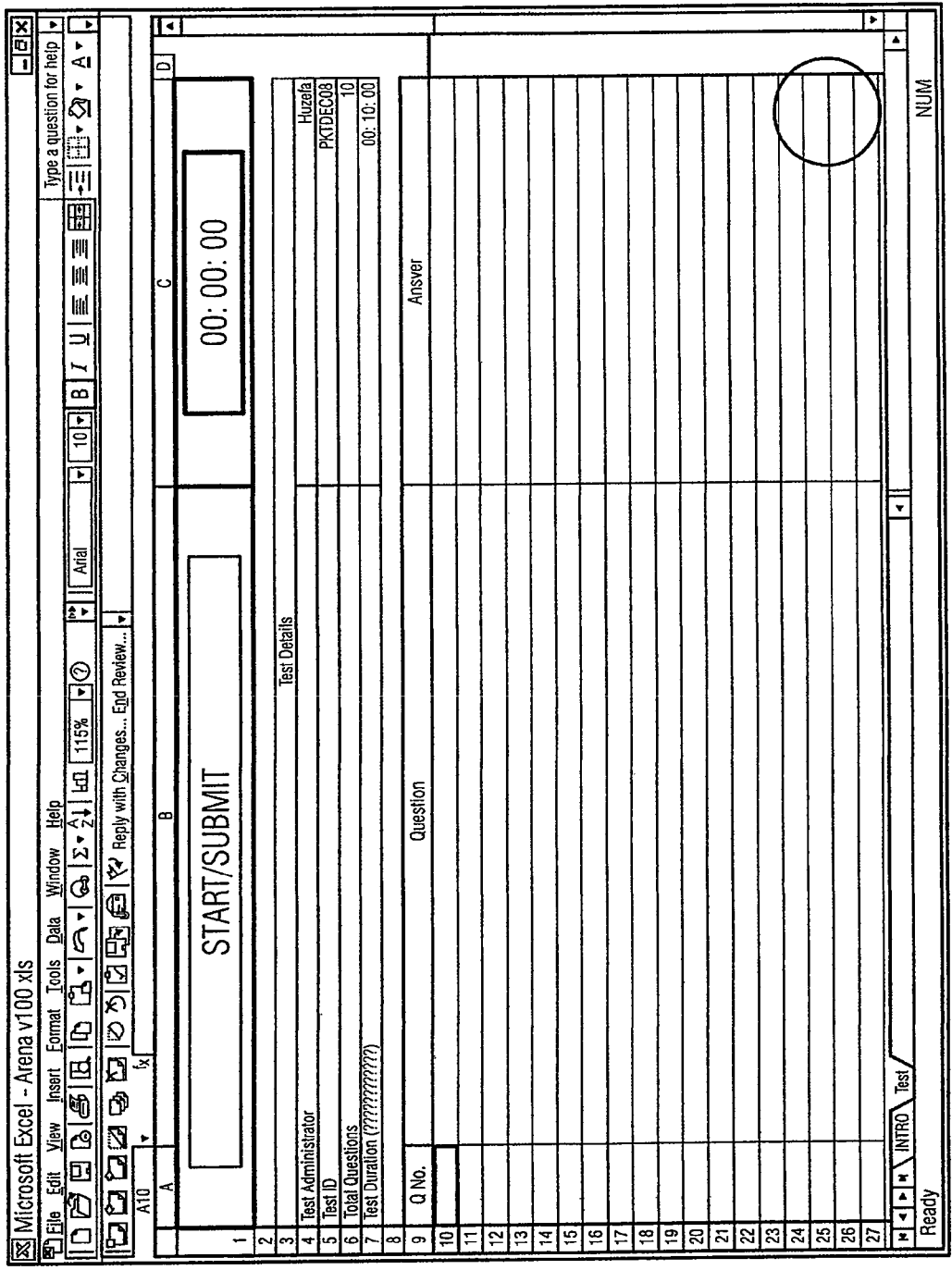
FIGS. 9A to 9C show exemplary screenshots of test sheets provided in a knowledge assessment tool.
Figure 9B:
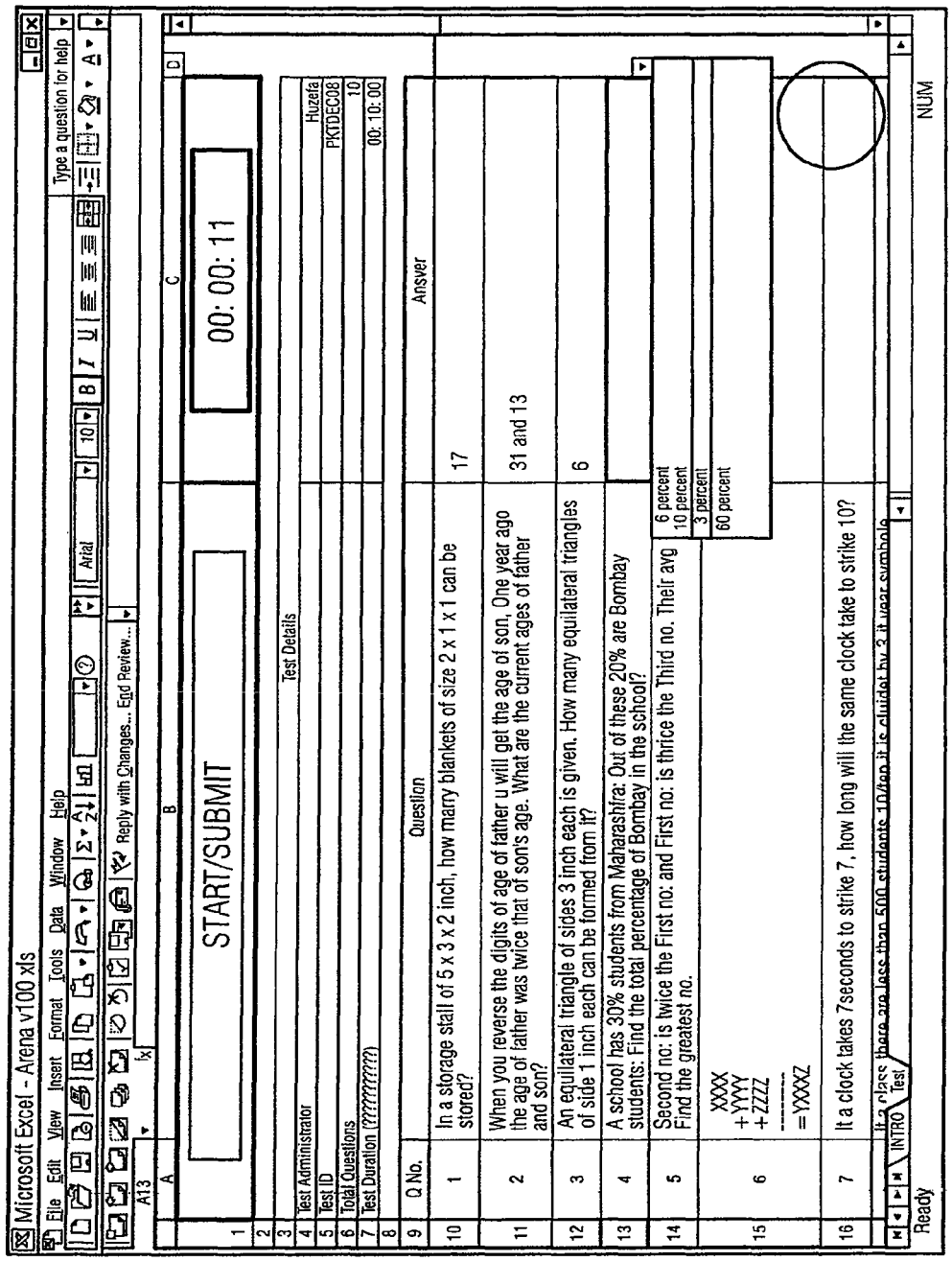
Figure 9C:
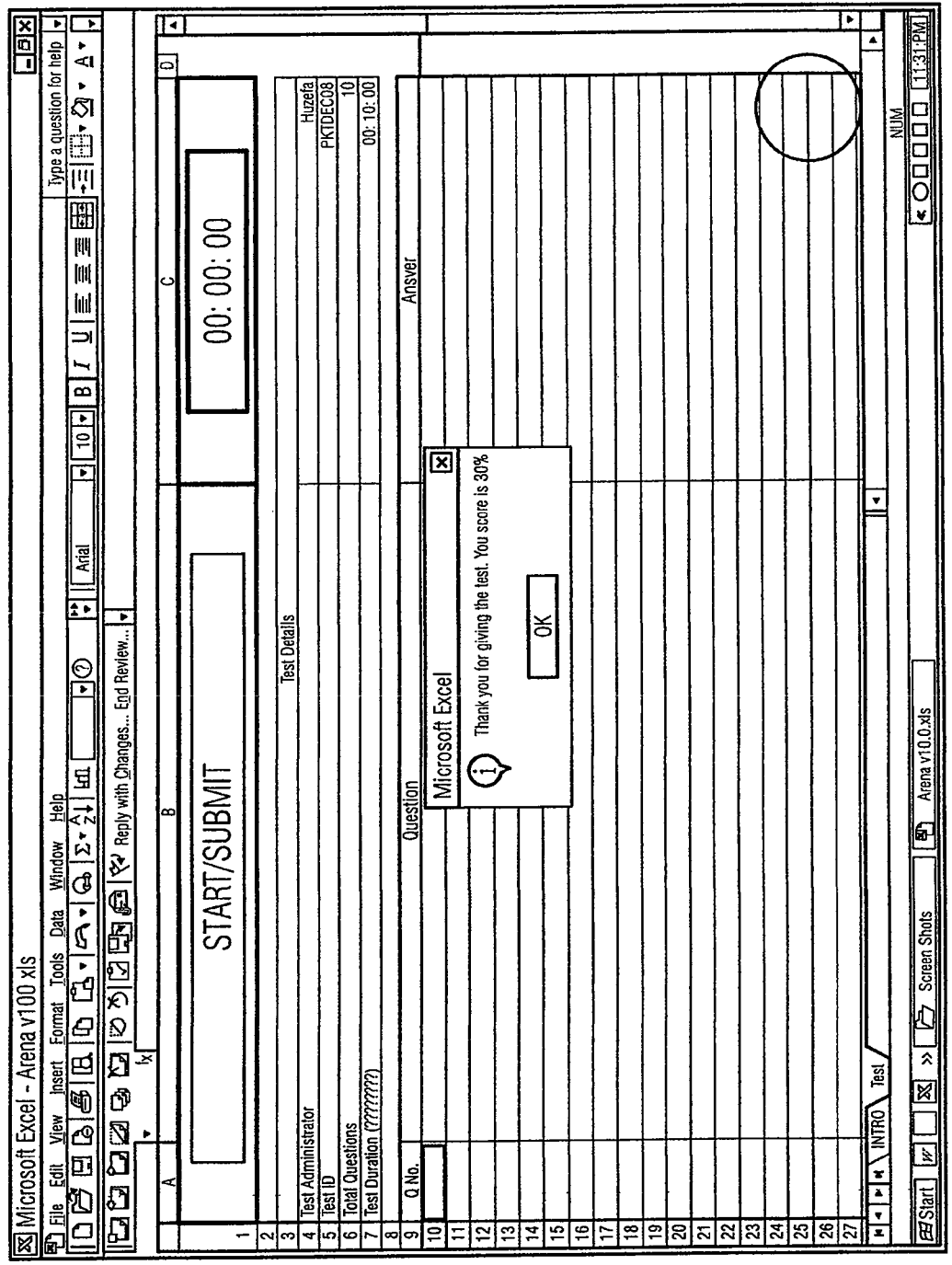

FIGS. 9A to 9C show an exemplary Test sheet provided by the tool. As already explained above, a user can access a Test sheet in order to perform a test on the tool.

As shown in FIG. 9A, a user may click on the "Start/Submit button" to load questions of a test and to start a timer, which is located on the right of the button.

As shown in FIG. 9B, a user may select type options to a question of the test in a drop down list in an answer column to answer the question.

As shown in FIG. 9C, a user has activated the "Start/Submit button" to submit his/her answers to the posed questions (e.g. those shown in FIG. 9B) of the test. When having activated said submission, the Test sheet of the user is cleared, the timer is reset and a conformation that the answers are submitted is displayed. If the user actives the "Start/Submit button" a further time, a score to his/her submission may be displayed if the user score flag 222 is set in the Setup sheet. In one exemplary implementation, when a preset time for the timer expires, answers, which the user has already selected may be submitted automatically.

FIG. 10 shows an exemplary Consolidation sheet provided by the tool. The Consolidation sheet, which may be loaded when a test report is generated to a test, may comprise a (report) header 224. The header 224 may comprise information such as domain IDs of users having performed the test, dates and times, when each of the users have performed the test, times taking by each of the users to perform the test and submit answers, test scores of each of the users. A test result (or answer set) 226 provided by a user may be specified as follows. If a cell has an entry "x - - - x - - - x", the corresponding question has not been posed to the user. If a cell is blank, the corresponding question, although posed, has not been answered by the user. If a font color of a cell is red, the corresponding question has been answered wrong by the user. If a font color of a cell is black, the corresponding question has been answered correctly by the user. Furthermore, the Consolidation sheet may comprise a subset of questions 228 selected from a plurality of questions, which have been posed to the user. Additionally, correct answers 230 to each of the questions in the subset of the questions may be displayed in the Consolidation sheet.

Figure 11:
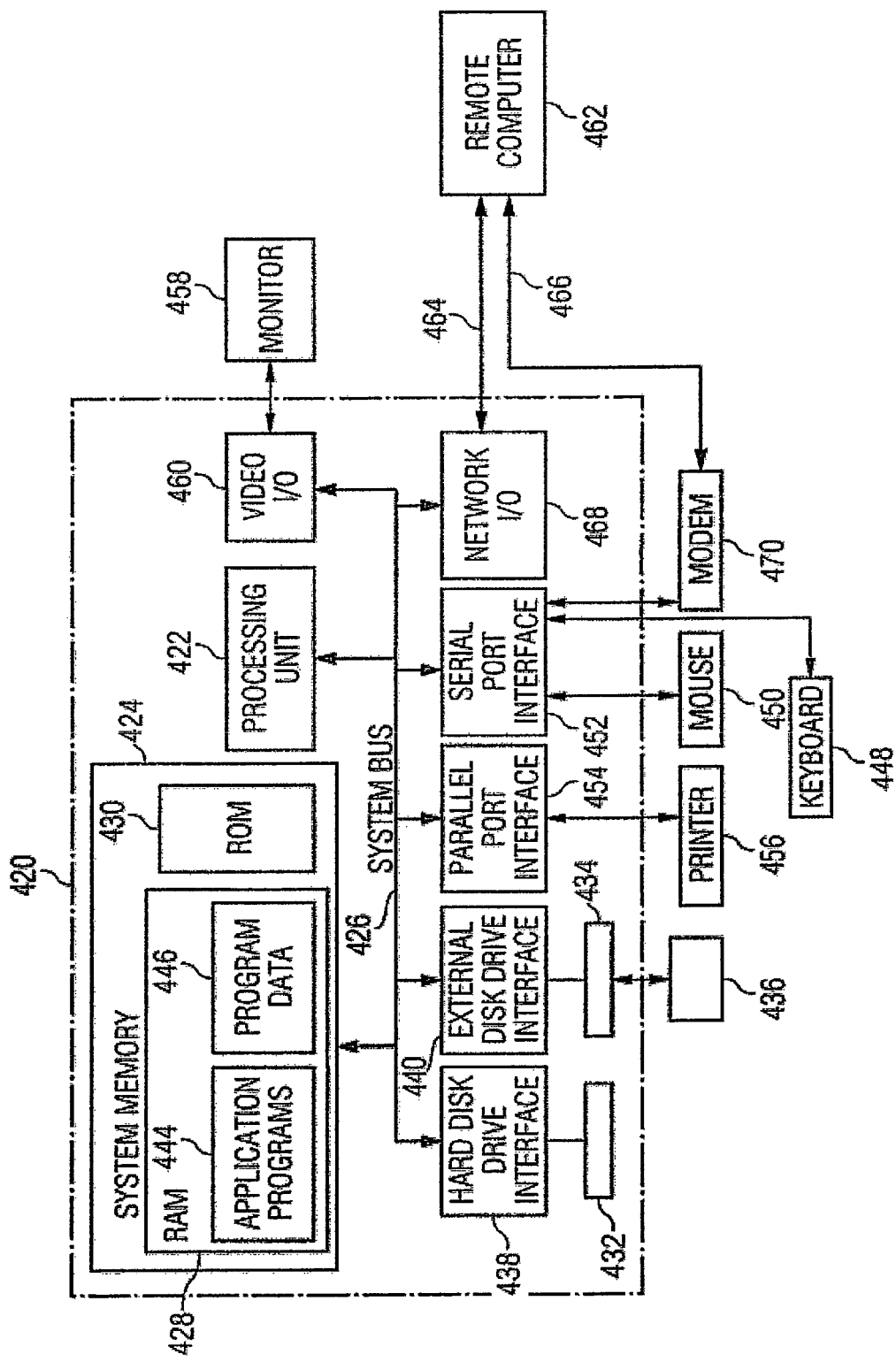
FIG. 11 shows a block diagram of an exemplary computer (network) system.

With reference to FIG. 11, an exemplary system for implementing the invention includes a general purpose computing device in the form of a conventional computing environment 420 (e.g. personal computer), including a processing unit 422, a system memory 424, and a system bus 426, that couples various system components including the system memory 424 to the processing unit 422. The processing unit 422 may perform arithmetic, logic and/or control operations by accessing system memory 424. The system memory 424 may store information and/or instructions for use in combination with processing unit 422. The system memory 424 may include volatile and non-volatile memory, such as random access memory (RAM) 428 and read only memory (ROM) 430. A basic input/output system (BIOS) containing the basic routines that helps to transfer information between elements within the personal computer 420, such as during start-up, may be stored in ROM 430. The system bus 426 may be any of several types of bus structures including a memory bus or memory controller, a peripheral bus, and a local bus using any of a variety of bus architectures.

The personal computer 420 may further include a hard disk drive 432 for reading from and writing to a hard disk (not shown), and an external disk drive 434 for reading from or writing to a removable disk 436. The removable disk 436 may be a magnetic disk for a magnetic disk driver or an optical disk such as a CD ROM for an optical disk drive. The hard disk drive 434 and external disk drive 434 are connected to the system bus 426 by a hard disk drive interface 438 and an external disk drive interface 440, respectively. The drives and their associated computer-readable media provide nonvolatile storage of computer readable instructions, data structures, program modules and other data for the personal computer 420. The data structures may include relevant data of the implementation of the computer-implemented method, system, and computer program product for processing and managing test data as described in more detail above. The relevant data may be organized in a database, for example a relational or object database.

Although the exemplary environment described herein employs a hard disk (not shown) and an external disk, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk, ROM 430 or RAM 428, including an operating system (not shown), one or more application programs 444, other program modules (not shown), and program data 446. The application programs 444 may include at least a part of the functionality as detailed in FIGS. 1 to 10.

A user may enter commands and information, as discussed below, into the personal computer 420 through input devices such as keyboard 448 and mouse 450. Other input devices (not shown) may include a microphone (or other sensors), joystick, game pad, scanner, or the like. These and other input devices may be connected to the processing unit 422 through a serial port interface 452 that is coupled to the system bus 426, or may be collected by other interfaces, such as a parallel port interface 454, game port or a universal serial bus (USB). Further, information may be printed using printer 456. The printer 456 and other parallel input/output devices may be connected to the processing unit 422 through parallel port interface 454. A monitor 458 or other type of display device is also connected to the system bus 426 via an interface, such as a video input/output 460. In addition to the monitor, computing environment 420 may include other peripheral output devices (not shown), such as speakers or other audible output.

The computing environment 420 may communicate with other electronic devices such as a computer, telephone (wired or wireless), personal digital assistant, television, or the like. To communicate, the computer environment 420 may operate in a networked environment using connections to one or more electronic devices. FIG. 11 depicts the computer environment networked with remote computer 462. The remote computer 462 may be another computing environment such as a server, a router, a network PC, a peer device or other common network node, and may include many or all of the elements described above relative to the computing environment 420. The logical connections depicted in FIG. 11 include a local area network (LAN) 464 and a wide area network (WAN) 466. Such networking environments are commonplace in offices, enterprise-wide computer networks, intranets and the Internet.

When used in a LAN networking environment, the computing environment 420 may be connected to the LAN 464 through a network I/O 468. When used in a WAN networking environment, the computing environment 420 may include a modem 470 or other means for establishing communications over the WAN 466. The modem 470, which may be internal or external to computing environment 420, is connected to the system bus 426 via the serial port interface 452. In a networked environment, program modules depicted relative to the computing environment 420, or portions thereof, may be stored in a remote memory storage device resident on or accessible to remote computer 462. Furthermore other data relevant to the application of the for processing and managing test data method (described in more detail further above) may be resident on or accessible via the remote computer 462. The data may be stored for example in an object or a relation database. It will be appreciated that the network connections shown are exemplary and other means of establishing a communications link between the electronic devices may be used.

The above-described computing system is only one example of the type of computing system that may be used to implement the method for processing and managing test data.

List of Reference Numerals

10 method for setting up a knowledge assessment tool and designing a test
S1-S12 method steps of a method for setting up a knowledge assessment tool and designing a test
20 method for giving a test on a knowledge assessment tool
S21-S25 method steps of a method for giving a test on a knowledge assessment tool
30 method for generating a test in a knowledge assessment tool
S31-S34 method steps of a method for generating a test on a knowledge assessment tool
40 method for clearing a data storage device and designing a new test in a knowledge assessment tool
S41-S46 method steps of a method for clearing a data storage device and designing a new test in a knowledge assessment tool
50 method for generating a random subset of questions from a plurality of questions
S51-S57 method steps of a method for generating a random subset of questions from a plurality of questions in a knowledge assessment tool
60 method for generating a test report from test results in a knowledge assessment tool
S61-S68 method steps of a method for generating a test report from test results in a knowledge assessment tool
70 method for clearing a data storage device of a knowledge assessment tool
S71-S75 method steps of a method for clearing a data storage device of a knowledge assessment tool

| | |
|---|---|
| 110 | shared drive |
| 112 | knowledge assessment tool |
| 114 | data storage device |
| 120 | client or user computer |
| 130 | administrator (or admin) computer |
| S101 | performing (parts of) the method 10 |
| S102 | performing (parts of) the method 30 |
| S103 | performing (parts of) the method 20 |
| S104 | performing (parts of) the method 20 |
| 202 | path |
| 204 | creation button |
| 206 | test name |
| 208 | user name |
| 210 | test ID number |
| 212 | test duration time |
| 214 | starting date of a test |
| 216 | ending date of a test |
| 218 | number of questions in a subset of questions |
| 220 | flag to set randomization on a plurality of questions |
| 222 | flag to set a user score |
| 224 | header of a test report |
| 226 | test results or answers to a test |
| 228 | subset of questions |
| 230 | correct answers to subset of questions |
| 420 | computing environment |
| 422 | processing unit |
| 424 | system memory |
| 426 | system bus |
| 428 | random access memory (RAM) |
| 430 | read only memory (ROM) |
| 432 | hard disk drive |
| 434 | external disk drive |
| 436 | removable disk |
| 438 | hard disk drive interface |
| 440 | external disk drive interface |
| 444 | application program |
| 446 | program data |
| 448 | keyboard |
| 450 | mouse |
| 452 | serial port interface |
| 454 | parallel port interface |
| 456 | printer |
| 458 | monitor |
| 460 | video input/output |
| 462 | remote computer |
| 464 | local area network (LAN) |
| 466 | wide area network (WAN) |
| 468 | network I/O |
| 470 | a modem |

The invention claimed is:

1. A non-transitory computer readable storage medium storing computer readable instructions, which when loaded and run in a computer, cause the computer to perform a method for processing and managing test data, the method comprising:

providing a plurality of questions for a test in a tool, the tool being located in a first shared folder;

providing a data storage device on a second shared folder, wherein the data storage device comprises a plurality of database files, wherein each database file of the plurality of database files is assigned to a user name from a list of user names used to identify a plurality of users;

retrieving time-stamps of the database files from directory information of the database files;

retrieving date-times from the retrieved time-stamps and assigning the date-times to the corresponding user names in the list of user names;

if a user from the plurality of users performs the test and submits a test result, storing the test result in a database file corresponding to a user name of the user, and updating the time-stamp of said corresponding database file; and in response to receiving a request for generating a test report:

comparing the date-time of a user name and the time-stamp of a database file corresponding to user name; and when the date-time does, not match the time-stamp, accessing the database file to retrieve a test result, and appending the retrieved test result to the test report.

2. The non-transitory computer readable storage medium according to claim 1, wherein making the order assignment comprises:

ordering the plurality of questions according to their associated random numbers in ascending order.

3. The non-transitory computer readable storage medium according to claim 1, further comprising:

generating new random numbers for each of the questions from the plurality of questions after the user has accessed the test.

4. The non-transitory computer readable storage medium according to claim 1, wherein, if for a database file from the plurality of database files, an associated time-stamp differs from a date time assigned to a corresponding user name, further comprising:

clearing and saving the cleared database file, and retrieving an updated date-time of the time-stamp of the cleared database file and assigning the updated date-time to the corresponding user name.

5. The non-transitory computer readable storage medium according to claim 1, wherein the tool is implemented in Excel.

6. A system for processing and managing test data, comprising:

a first shared folder located on a server, the first shared folder comprising a tool which provides a plurality of questions for a test;

a second shared folder located on the server, the second shared folder storing a data storage device, wherein the data storage device comprises a plurality of database files, wherein each database file of the plurality of database files is assigned to a user name from a list of user names used to identify a plurality of users; and wherein the tool is operable to:

retrieve time-stamps of the database files from directory information of the database files;

retrieve date-times from the retrieved time-stamps and assign the date-times to the corresponding user names in the list of user names;

if a user from the plurality of users performs the test and submits a test result from a client computer, store the test result in a database file corresponding to a user name of the user, all and update the time-stamp of said corresponding to database file; and in response to receiving a request for generating a test report:

compare the date-time of a user name and the time-stamp of a database file corresponding to the user name; and when the date-time does not match the time-stamp, access the database file to retrieve a test results, and appending the retrieved test result to the test report.

7. The system according to claim 6, wherein the tool is further operable to:

make the order assignment by ordering the plurality of questions according to their associated random numbers in ascending order.

8. The system according to claim 6, wherein the tool is further operable to:

generate new random numbers for each of the questions from the plurality of questions after the user has accessed the test.

9. The system according to claim 6, wherein, if for a database file from the plurality of database files, an associated time-stamp differs from a date time assigned to a corresponding user name, the tool is further operable to provide means for:

clearing and saving the cleared database file, and retrieving an updated date-time of the time-stamp of the cleared database file and assigning the updated date-time to the corresponding user name.

10. The system according to claim 6, wherein the tool is implemented in Excel.

* * * * *

UNITED STATES PATENT AND TRADEMARK OFFICE
CERTIFICATE OF CORRECTION

| | | |
|---|---|---|
| PATENT NO. | : 8,781,390 B2 | Page 1 of 1 |
| APPLICATION NO. | : 12/419645 | |
| DATED | : July 15, 2014 | |
| INVENTOR(S) | : Huzefa Yusuf Bakir | |

It is certified that error appears in the above-identified patent and that said Letters Patent is hereby corrected as shown below:

In the Claims

Claim 6, col. 18, line 10, delete "all" after -- name of the user --.

Signed and Sealed this
Ninth Day of December, 2014

Michelle K. Lee
*Deputy Director of the United States Patent and Trademark Office*